(12) United States Patent
Kako

(10) Patent No.: US 9,350,551 B2
(45) Date of Patent: May 24, 2016

(54) VALIDITY DETERMINATION METHOD AND VALIDITY DETERMINATION APPARATUS

(71) Applicant: FUJITSU LIMITED, Kawasaki-shi, Kanagawa (JP)

(72) Inventor: Masaharu Kako, Toukai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/102,940

(22) Filed: Dec. 11, 2013

(65) Prior Publication Data
US 2014/0289532 A1  Sep. 25, 2014

(30) Foreign Application Priority Data
Mar. 19, 2013  (JP) .................................. 2013-056973

(51) Int. Cl.
*H04L 9/32* (2006.01)
(52) U.S. Cl.
CPC .................................... *H04L 9/3247* (2013.01)
(58) Field of Classification Search
CPC ........................... H04L 9/3247; H04L 31/0869
USPC ....................... 713/176; 380/282; 726/4–5, 14
See application file for complete search history.

(56) References Cited

U.S. PATENT DOCUMENTS

| | | | | |
|---|---|---|---|---|
| 6,546,492 | B1 * | 4/2003 | Walker et al. ...................... | 726/3 |
| 6,625,734 | B1 * | 9/2003 | Marvit et al. .................... | 726/28 |
| 2010/0122081 | A1 * | 5/2010 | Sato et al. ....................... | 713/158 |

FOREIGN PATENT DOCUMENTS

JP       2012-175365       9/2012

* cited by examiner

*Primary Examiner* — Hadi Armouche
*Assistant Examiner* — Angela Holmes
(74) *Attorney, Agent, or Firm* — Fujitsu Patent Center

(57) ABSTRACT

A validity determination method includes having a receiving apparatus of electronic data identify a public key corresponding to an electronic signature attached to the received electronic data among one or more public keys having respective valid terms, send a resend-request of the electronic data if the identified public key is not valid, and determine validity of the electronic data based on whether the electronic data is resent in response to the resend-request; and having a sending apparatus of the electronic data resend the electronic data to the receiving apparatus in response to receiving the resend-request if the sending apparatus has sent the electronic data relevant to the resend-request in a past.

8 Claims, 34 Drawing Sheets

116

| PRIVATE KEY | PUBLIC KEY | VALID TERM |
|:---:|:---:|:---:|
| k | K | UNTIL AUGUST, 13th |
| n | N | FROM AUGUST, 14th |

| CREATION DATE AND TIME | 8/13 10:00 |
|---|---|
| SOURCE ADDRESS | A |
| DESTINATION ADDRESS | B |
| MAIL ID | 100 |
| BODY | HELLO |
| ELECTRONIC SIGNATURE | E(digest#1,k) |

DIGEST VALUE = digest#1 (covering rows above ELECTRONIC SIGNATURE)

FIG.10

| SENDER ID | PUBLIC KEY | VALID TERM |
|---|---|---|
| A | K | UNTIL AUGUST, 13th |
| A | N | FROM AUGUST, 14th |
| D | K#N | |

| | | |
|---|---|---|
| CREATION DATE AND TIME | 8/14 20:00 | ⎫ |
| SOURCE ADDRESS | B | ⎬ DIGEST VALUE |
| DESTINATION ADDRESS | A | ⎬ =digest#2 |
| MAIL ID | 1000 | ⎭ |
| BODY | RESEND-REQUEST<br>MAIL ID =100<br>ELECTRONIC SIGNATURE =E(digest#1,k) | |
| ELECTRONIC SIGNATURE | E(digest#2,k#B) | |

| CREATION DATE AND TIME | 8/13 10:00 |
|---|---|
| SOURCE ADDRESS | A |
| DESTINATION ADDRESS | B |
| MAIL ID | 100 |
| BODY | HELLO |
| ELECTRONIC SIGNATURE | E(digest#1,n) |

DIGEST VALUE = digest#1 (covers rows above ELECTRONIC SIGNATURE)

FIG.17

| CREATION DATE AND TIME | 8/14 20:00 | |
|---|---|---|
| SOURCE ADDRESS | B | |
| DESTINATION ADDRESS | A | |
| BODY | MAIL ID | 1001 |
| | RESEND-REQUEST | |
| | MAIL ID | =100 |
| | ELECTRONIC SIGNATURE | =E(digest#1,k) |
| | RECEIVED MAIL POINTER | =pointer#100 |
| ELECTRONIC SIGNATURE | E(digest#3,k#B) | |

DIGEST VALUE = digest#3

| CREATION DATE AND TIME | 8/14 21:00 |
|---|---|
| SOURCE ADDRESS | A |
| DESTINATION ADDRESS | B |
| MAIL ID | 2000 |
| BODY | REJECTION OF RESEND-REQUEST<br>　MAIL ID　　　　　　　　　＝100<br>　ELECTRONIC SIGNATURE ＝E(digest#1,k)<br>　RECEIVED MAIL POINTER ＝pointer#100 |
| ELECTRONIC SIGNATURE | E(digest#4,k) |

} DIGEST VALUE ＝digest#4

| CREATION DATE AND TIME | 8/13 10:00 |
|---|---|
| SOURCE ADDRESS | A |
| DESTINATION ADDRESS | B |
| MAIL ID | 100 |
| BODY | HELLO |

| CREATION DATE AND TIME | 8/13 10:00 |
|---|---|
| SOURCE ADDRESS | A |
| DESTINATION ADDRESS | B |
| MAIL ID | 100 |
| BODY | HELLO |
| ELECTRONIC SIGNATURE OF E-MAIL REQUESTED TO BE RESENT | E(digest#1,k) |
| RECEIVED E-MAIL POINTER OF E-MAIL REQUESTED TO BE RESENT | Pointer#100 |

FIG.27

| CREATION DATE AND TIME | 8/14 21:00 |
|---|---|
| SOURCE ADDRESS | A |
| DESTINATION ADDRESS | B |
| MAIL ID | 2000 |
| BODY | REJECT RESEND-REQUEST<br>MAIL ID =100<br>ELECTRONIC SIGNATURE=E(digest#1,k)<br>RECEIVED MAIL POINTER=pointer#100 |

| CREATION DATE AND TIME | 8/13 10:00 |
|---|---|
| SITE ID | http://aaa.bbb |
| CONTENT ID | http://aaa.bbb/xyz |
| BODY | HELLO |
| ELECTRONIC SIGNATURE | E(digest#1,k) |

DIGEST VALUE = digest#1 (covering Creation date and time, Site ID, Content ID, Body)

| BODY | RESEND-REQUEST<br>CONTENT ID = http://aaa.bbb/xyz<br>ELECTRONIC SIGNATURE = E(digest#1,k) |
|---|---|

FIG.43

| CREATION DATE AND TIME | 8/13 10:00 | ⎫ |
| --- | --- | --- |
| SITE ID | http://aaa.bbb | ⎬ DIGEST VALUE =digest#1 |
| CONTENT ID | http://aaa.bbb/xyz | |
| BODY | HELLO | ⎭ |
| ELECTRONIC SIGNATURE | E(digest#1,n) | |

VALIDITY DETERMINATION METHOD AND VALIDITY DETERMINATION APPARATUS

CROSS-REFERENCE TO RELATED APPLICATIONS

This application is based upon and claims the benefit of priority of the prior Japanese Priority Application No. 2013-056973 filed on Mar. 19, 2013, the entire contents of which are hereby incorporated by reference.

FIELD

The disclosures herein relate to a validity determining method and a validity determination apparatus.

BACKGROUND

An electronic signature is used for verifying validity of electronic data provided via a network such as an e-mail, a Web page or the like. Specifically, a sender A of electronic data generates an electronic signature of the electronic data with a private key, attaches the electronic signature to the e-mail, and sends the e-mail. A recipient B of the electronic data decrypts the electronic signature with a public key, which is the key paired with the private key, and authenticates that the electronic data is created by the sender A by verifying the decryption result is equal to the hash value of the electronic data.

However, the public key corresponding to the private key is easily obtained by a third party. Also, such a third party may obtain the private key from the public key by executing a considerable amount of calculation. Therefore, the likelihood of malicious usage of the private key increases while time passes due to the fact that the private key may be known to people other than the sender A.

Thereupon, it is often standard practice that paired keys (a private key and a public key) are set with a valid term, and the paired keys with an expired valid term are excluded from usage. For example, electronic data signed with an electronic signature whose valid term has expired is automatically removed because of the potential that the electronic data was made by a person who pretends to be a valid sender A.

RELATED-ART DOCUMENTS

Patent Documents

[Patent Document 1] Japanese Laid-open Patent Publication No. 2012-175365

However, even if the paired keys are within the valid term when the electronic data is sent by a valid sender A, the valid terms may have expired when a recipient B receives or views the electronic data. In this case, the electronic data may be automatically removed even if the electronic data is valid.

SUMMARY

According to at least one embodiment of the present invention, a validity determination method includes having a receiving apparatus of electronic data identify a public key corresponding to an electronic signature attached to the received electronic data among one or more public keys having respective valid terms, send a resend-request for the electronic data if the identified public key is not valid, and determine validity of the electronic data based on whether the electronic data is resent in response to the resend-request; and having a sending apparatus of the electronic data resend the electronic data to the receiving apparatus in response to receiving the resend-request if the sending apparatus has sent the electronic data relevant to the resend-request in a past.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 10 is a schematic view illustrating an example of a configuration of a public key storage section according to the first embodiment;

FIG. 12 is a schematic view illustrating an example of a configuration of a resend-request e-mail according to the first embodiment;

FIG. 17 is a schematic view illustrating an example of a configuration of a resend-request e-mail according to the second embodiment;

FIG. 27 is a schematic view illustrating an example of a configuration of a resend-rejection e-mail according to the third embodiment;

FIG. 43 is a schematic view illustrating an example of a configuration of content to be resent according to this embodiment;

DESCRIPTION OF EMBODIMENTS

Figure 1:
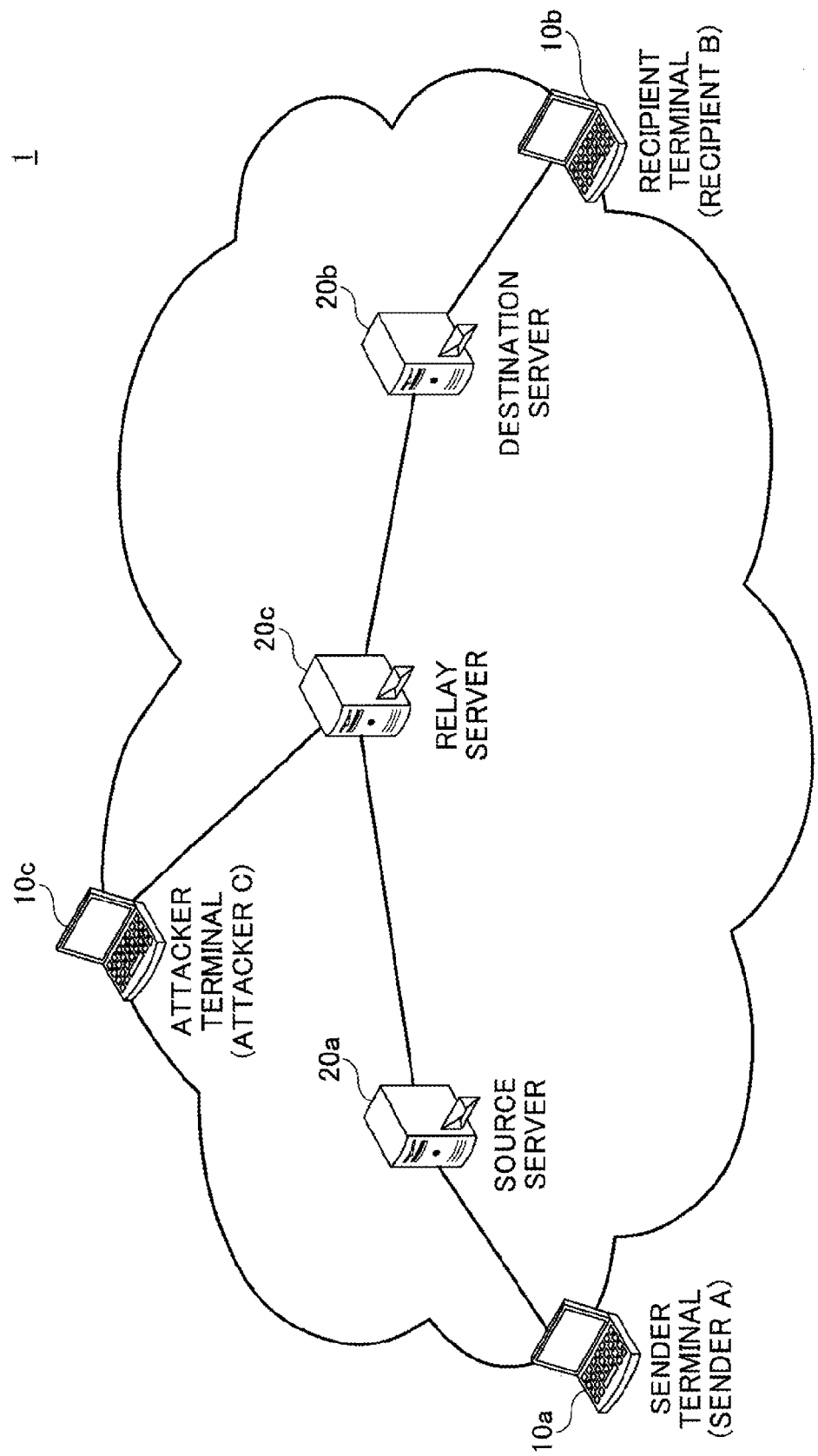
FIG. 1 is a schematic view illustrating an example of a configuration of a mail system according to a first embodiment of the present invention.

In the following, embodiments of the present invention will be described with reference to the drawings. According to at least one embodiment of the present invention, it is possible to determine validity of electronic data attached with an electronic signature whose valid term has expired. FIG. 1 is a schematic view illustrating an example of a configuration of a mail system 1 according to a first embodiment of the present invention. In FIG. 1, the mail system 1 includes a sender terminal 10*a*, a recipient terminal 10*b*, an attacker terminal 10*c*, a source server 20*a*, a destination server 20*b*, a relay server 20*c*, and the like.

The sender terminal 10*a* is a terminal used by a valid sender A of an e-mail. The sender terminal 10*a* is connected with the source server 20*a* via a network such as a LAN (Local Area Network). The source server 20*a* is a computer that transfers an e-mail, which is sent from the sender terminal 10*a* to the recipient B, via the relay server 20*c* using, for example, SMTP (Simple Mail Transfer Protocol). The relay server 20*c* is a computer for transferring an e-mail to the recipient B via the destination server 20*b* using, for example, SMTP. The relay server 20*c* is connected with the source server 20*a* and the destination server 20*b* via a network such as a LAN, the Internet or the like.

The recipient terminal 10*b* is a terminal used by the recipient B to receive an e-mail. The recipient terminal 10*b* receives an e-mail sent to the recipient B from the destination server 20*b* using, for example, POP (Post Office Protocol).

The attacker terminal 10*c* is a terminal used by an attacker C who pretends to be the sender A. The attacker C pretends to be the sender A, and sends an e-mail to the recipient B.

Here, the sender terminal 10*a*, the recipient terminal 10*b*, and the attacker terminal 10*c* are electronic devices that have receiving/sending functions for an e-mail, for example, a PC (personal computer), a tablet-type terminal, a smart phone, a cellular phone, or the like. In the following, these terminals are referred to as the "terminals 10" if no distinctions are required.

Figure 2:
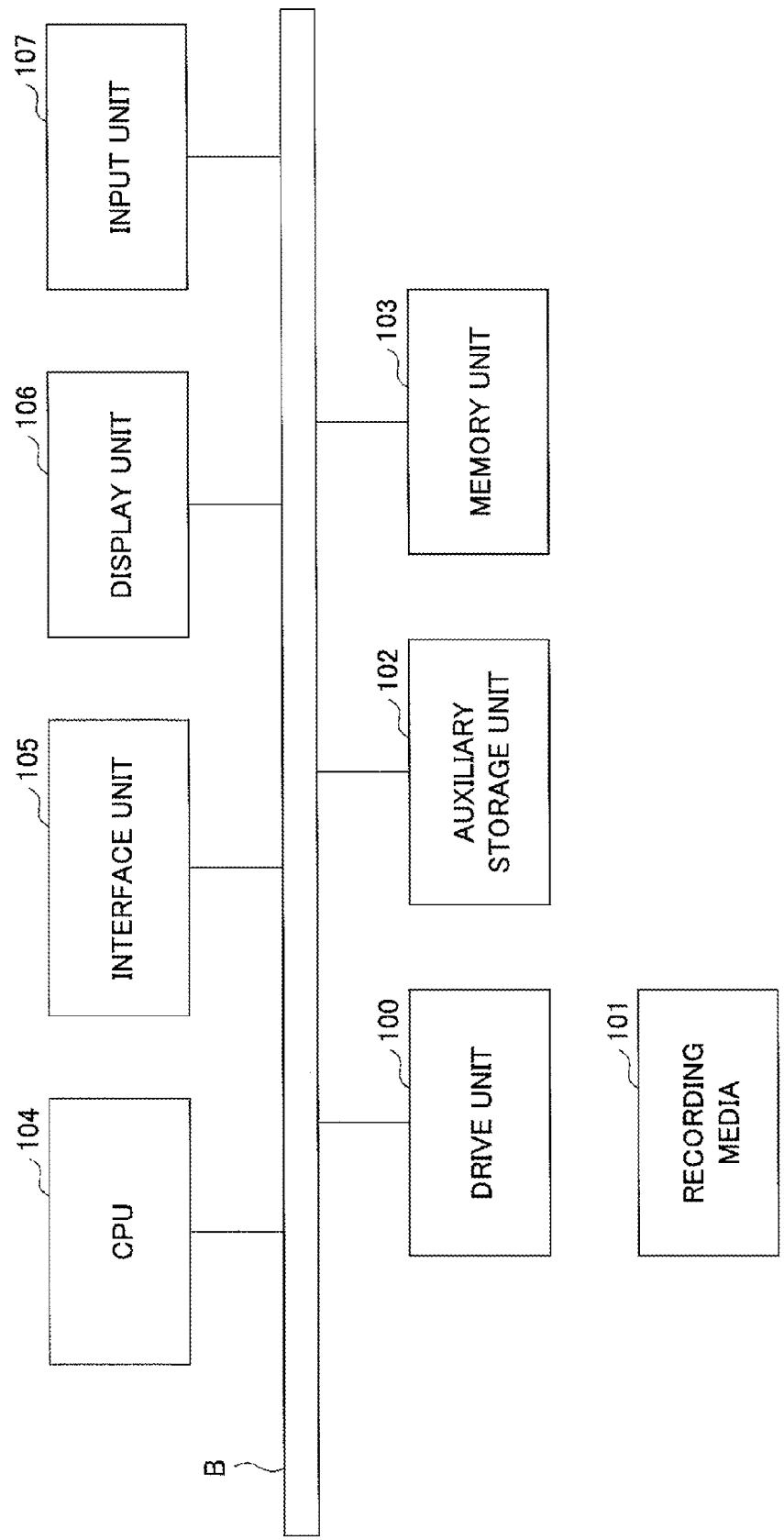
FIG. 2 is a schematic view illustrating an example of a hardware configuration of a terminal according to the first embodiment.

FIG. 2 is a schematic view illustrating an example of a hardware configuration of one of the terminals 10 according to the first embodiment. The terminal 10 illustrated in FIG. 2 includes a drive unit 100, an auxiliary storage unit 102, a memory unit 103, a CPU 104, an interface unit 105, a display unit 106, an input unit 107, and the like that are mutually connected by a bus B.

The program implementing procedures on the terminal 10 is provided with a recording medium 101. When the recording medium 101 storing the program is inserted into the drive unit 100, the program is installed into the auxiliary storage unit 102 from the recording medium 101 via the drive unit 100. However, installation of the program is not necessarily executed from the recording medium 101, but may be downloaded from another computer via a network. The auxiliary storage unit 102 stores the installed program, and stores required files, data, and the like as well.

The memory unit 103 reads the program from the auxiliary storage unit 102 to store the program into it when receiving a start command for the program. The CPU 104 implements functions relevant to the terminal 10 by executing the program stored in the memory unit 103. The interface unit 105 is used as an interface for connecting with a network. The display unit 106 displays a GUI (Graphical User Interface) and the like for the program. The input unit 107 includes a keyboard, a mouse, and the like, which are used for inputting various operational commands.

Here, an example of the recording medium 101 may be a portable recording medium such as a CD-ROM, a DVD disk, an SD memory card, a USB memory, etc. Also, an example of the auxiliary storage unit 102 may be an HDD (Hard Disk Drive), a flash memory, or the like. Both the recording medium 101 and the auxiliary storage unit 102 correspond to computer-readable recording media.

The source server 20a, the destination server 20b, and the relay server 20c may also have the hardware illustrated in FIG. 2. However, these servers may not have the display unit 106 and the input unit 107.

Figure 3:
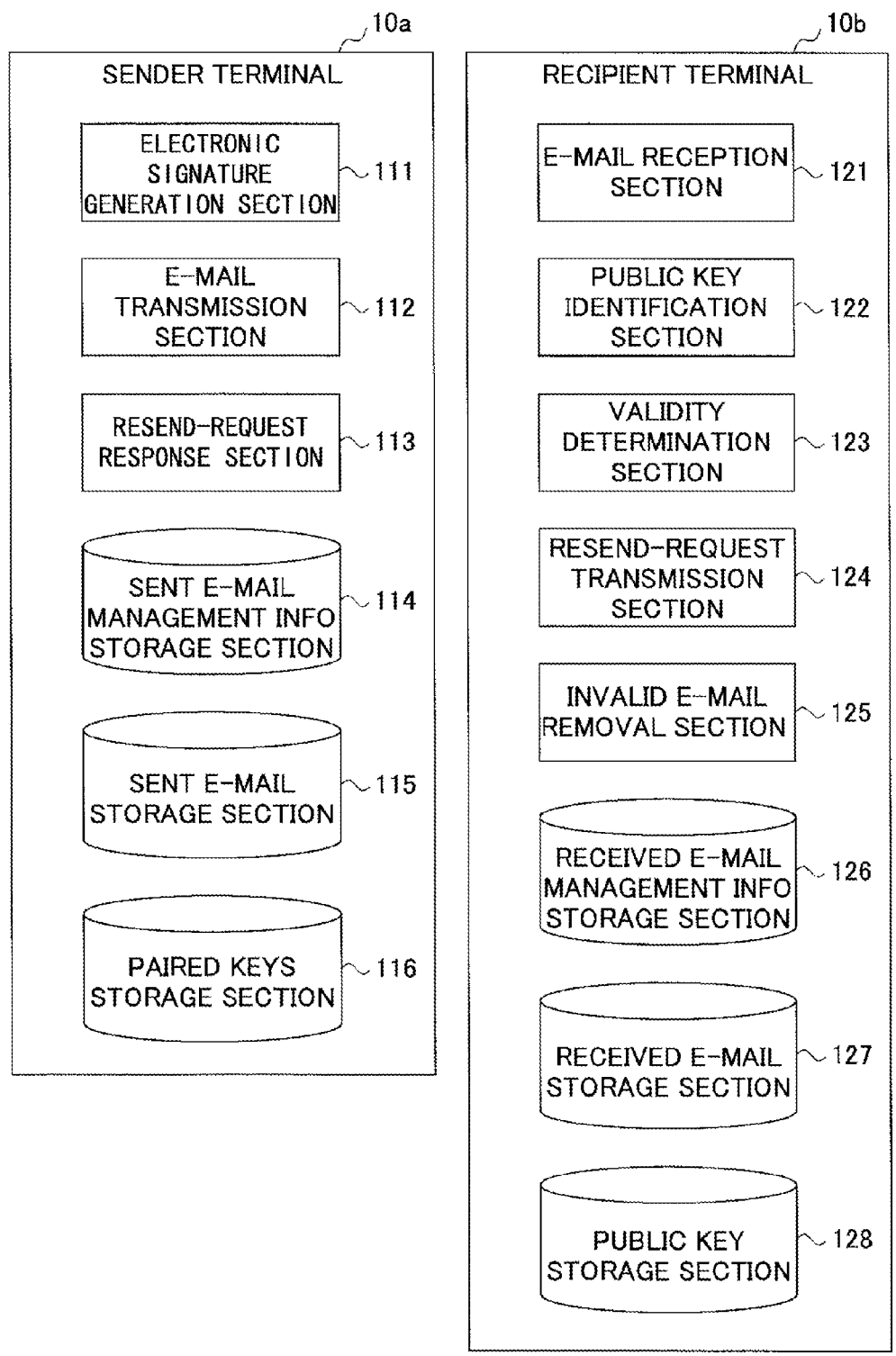
FIG. 3 is a schematic view illustrating an example of a functional configuration of a sender terminal and a recipient terminal according to the first embodiment.

FIG. 3 is a schematic view illustrating an example of a functional configuration of the sender terminal 10a and the recipient terminal 10b according to the first embodiment. In FIG. 3, the sender terminal 10a includes an electronic signature generation section 111, an e-mail transmission section 112, a resend-request response section 113, and the like. These sections are implemented by procedures that the program installed in the sender terminal 10a has the CPU 104 of the sender terminal 10a execute. The sender terminal 10a also utilizes a sent e-mail management information storage section 114, a sent e-mail storage section 115, a paired-keys storage section 116, and the like. These storage sections may be implemented by the auxiliary storage unit 102 of the sender terminal 10a, or a storage device connected with the sender terminal 10a via a network.

The electronic signature generation section 111 generates an electronic signature for an e-mail to be sent. The e-mail transmission section 112 sends e-mail to be sent. An e-mail to be sent has the electronic signature attached that is generated by the electronic signature generation section 111. The resend-request response section 113 executes a procedure in response to a resend-request of an e-mail. A resend-request of an e-mail is sent to the source address of the e-mail from the recipient terminal 10b if the recipient terminal 10b cannot determine the validity of the received e-mail.

The sent e-mail management information storage section 114 stores management information for each e-mail that has been sent (called "sent e-mail management information", hereafter). The sent e-mail storage section 115 stores an entity part of an e-mail that has been sent (for example, a file that stores the e-mail). The paired-keys storage section 116 stores an associated pair of a private key and a public key that are used for generating an electronic signature, or determining validity of an e-mail attached with the electronic signature.

The recipient terminal 10b includes an e-mail reception section 121, a public key identification section 122, a validity determination section 123, a resend-request transmission section 124, an invalid e-mail removal section 125, and the like. These sections are implemented by procedures that the program installed in the sender terminal 10b has the CPU 104 of the sender terminal 10b execute. The sender terminal 10b also utilizes a received e-mail management information storage section 126, a received e-mail storage section 127, a public key storage section 128, and the like. These storage sections may be implemented by the auxiliary storage unit 102 of the sender terminal 10b, or a storage device connected with the sender terminal 10b via a network.

The e-mail reception section 121 receives an e-mail from the destination server 20b using POP (Post Office Protocol) or the like. The public key identification section 122 identifies a public key among public keys stored in the public key storage section 128 that corresponds to the electronic signature attached to a received e-mail. The validity determination section 123 determines validity of the received e-mail based on whether the identified public key is valid. Determining whether the identified public key is valid is equivalent to determining whether the electronic signature attached to the received e-mail is valid. The resend-request transmission section 124 sends a resend-request to the source address of the e-mail if the electronic signature is not valid, namely validity of the e-mail is not confirmed. The validity determination section 123 also determines validity of a received e-mail that has an invalid electronic signature attached based on whether resending is made in response to the resend-request. The invalid e-mail removal section 125 removes a received e-mail determined as invalid (or not determined as valid) by the validity determination section 123, and removes management information of the received e-mail from the received e-mail storage section 127 or the received e-mail management information storage section 126.

The received e-mail management information storage section 126 stores management information (called "received e-mail management information", hereafter) for each e-mail that has been received. The received e-mail storage section 127 stores the entity part of a received e-mail. The public key storage section 128 stores a public key that is paired with a private key used for generating an electronic signature.

Figure 4:
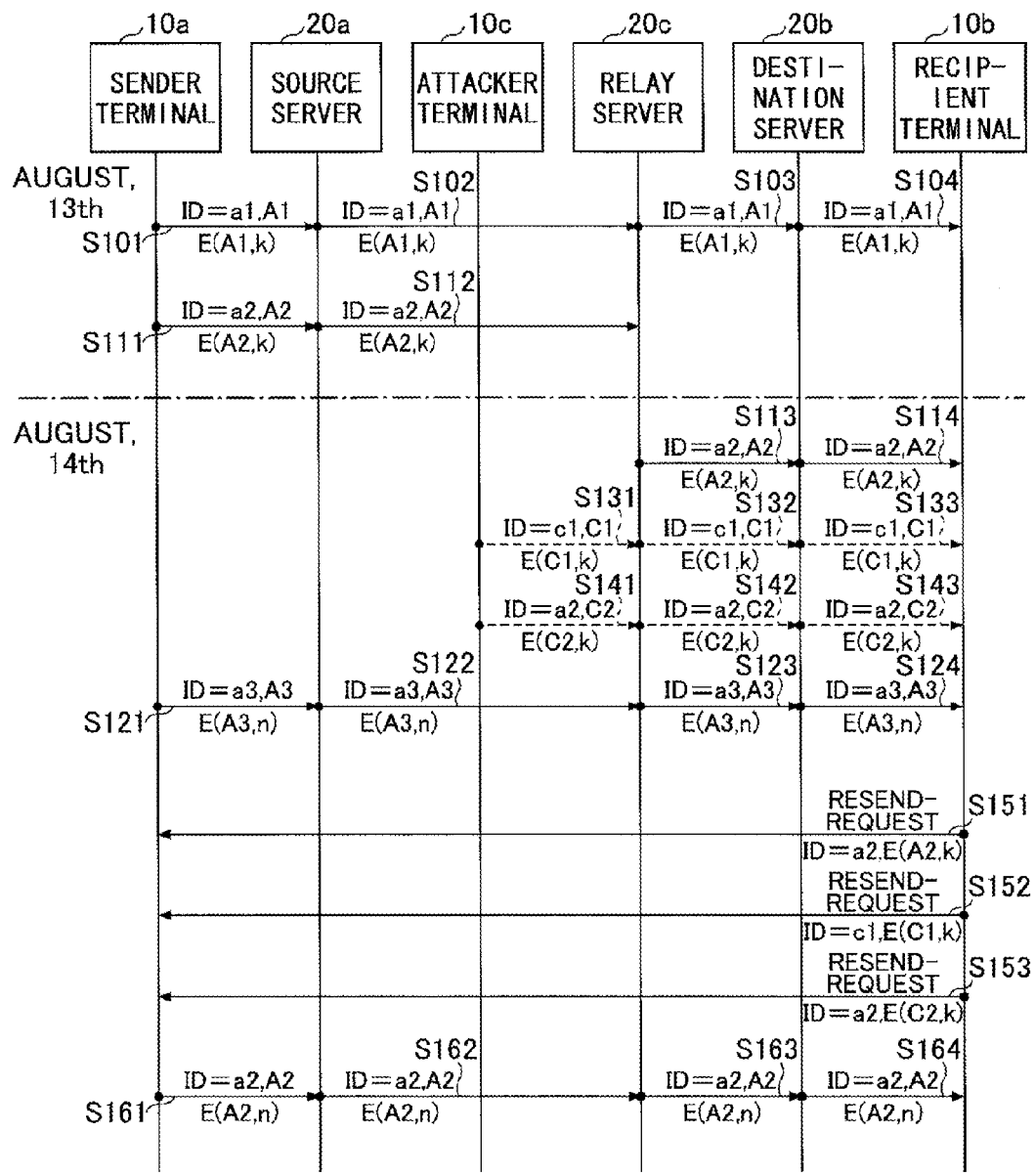
FIG. 4 is a sequence chart for describing an example of process steps executed on a mail system according to the first embodiment.

In the following, process steps executed on the mail system 1 will be described. FIG. 4 is a sequence chart for describing an example of process steps executed on the mail system 1 according to the first embodiment.

At Steps S101, S111, and S121, the sender terminal 10a sends e-mails to the recipient B, respectively. Here, Steps S101, S111, and S121 are assumed to be executed at timings different from each other to send respective e-mails having content different from each other.

Specifically, at Step S101, an e-mail is sent at a certain time on August, 13th, which has a mail ID a1 and content A1 (called the "e-mail a1(A1)", hereafter, other e-mails are named following the same naming convention). The mail ID is an example of identification information for identifying each e-mail in the present embodiment.

The e-mail a1 (A1) has an electronic signature E(A1,k) attached. The electronic signature E(A1,k) is an electronic signature that is generated by encrypting a digest value (a hash value of a message digest or the like) of A1 with a private key k.

At Step S111, an e-mail a2 (A2) is sent at a certain time on August, 13th, which has a mail ID a2 and content A2. The e-mail a2 (A2) has an electronic signature E(A2,k) attached.

Here, the end date of the valid term of the private key k used for generating the electronic signatures attached to the e-mail a1 (A1) and e-mail a2 (A2) is assumed to be August, 13th. Here, in the present embodiment, the valid term of a private key is also the valid term of a public key corresponding to the private key, and the valid term of an electronic signature generated using the private key.

At Step S121, an e-mail a3 (A3) is sent at a certain time on August, 14th, which has a mail ID a3 and content A3. The e-mail a3 (A3) has an electronic signature E(A3,n) attached.

Here, the start date of the valid term of the private key n used for generating the electronic signature E(A3,n) is assumed to be August, 14th.

The e-mail a1 (A1), e-mail a2 (A2), and e-mail a3 (A3) are transferred to the destination server 20b via the source server 20a and the relay server 20c (Steps S102, S103, S112, S113, S122, and S123). Here, assume that August, 13th has passed while the relay server 20c is transferring the e-mail a2 (A2).

The recipient terminal 10b receives the e-mail a1 (A1) on August, 13th (Step S104), and receives the e-mail a2(A2) and e-mail a3 (A3) on August, 14th (Steps S114 and S124).

On the other hand, the attacker terminal 10c sends an e-mail c1 (C1) and an e-mail a2 (C2) on August, 14th to the recipient B (Steps S131 and S141).

The e-mail c1 (C1) has the electronic signature E(C1,k) attached, and the e-mail a2 (C2) has the electronic signature (C2,k) attached. Namely, at the attacker terminal 10c, the electronic signatures are generated using the private key k which is supposed to be held only by the sender A. Also, the source address of the e-mail sent from the attacker terminal 10c is the same as the e-mail address of the sender A. Further, the e-mail a2 (C2) has the common mail ID with e-mail a2 (A2).

The e-mail c1 (C1) and e-mail a2 (C2) are transferred to the destination server 20b via the relay server 20c (Steps S132 and S142). The recipient terminal 10b receives the e-mail c1 (C1) and e-mail a2 (C2) on August, 14th (Steps S133 and S143).

Among the e-mails received by the recipient terminal 10b, the e-mails whose electronic signatures (or paired keys relevant to the electronic signature) have expired when received at the recipient terminal 10b are the e-mail a2 (A2), e-mail c1 (C1), and e-mail a2 (C2). Thereupon, the recipient terminal 10b sends resend-request e-mails for these three e-mails to the source addresses, respectively (Steps S151, S152, and S153).

In response to receiving the resend-request e-mails, the sender terminal 10a resends the e-mails only for e-mails that the sender terminal 10A has previously sent in the past (Step S161). Therefore, the e-mail a2 (A2) is resent, whereas the e-mail c1 (C1) and e-mail a2 (C2) are not resent. The e-mail a2 (A2) being resent has an electronic signature E(A2,n) attached that is generated with a private key whose valid term includes August, 14th.

The resent e-mail a2 (A2) is received at the recipient terminal 10b via the source server 20a, relay server 20c, and destination server 20b by the end of August, 14th, until then, the electronic signature E(A2,n) is valid (Steps S162-S164). Consequently, the e-mail a2 (A2) is treated as a valid e-mail at the recipient terminal 10b. On the other hand, the e-mail c1 (C1) and e-mail a2 (C2) are treated as invalid e-mails because no responses to the resend-request e-mails have been made.

Next, process steps executed on the sender terminal 10a or the recipient terminal 10b will be described that are relevant with FIG. 4.

Figures 5, 6:
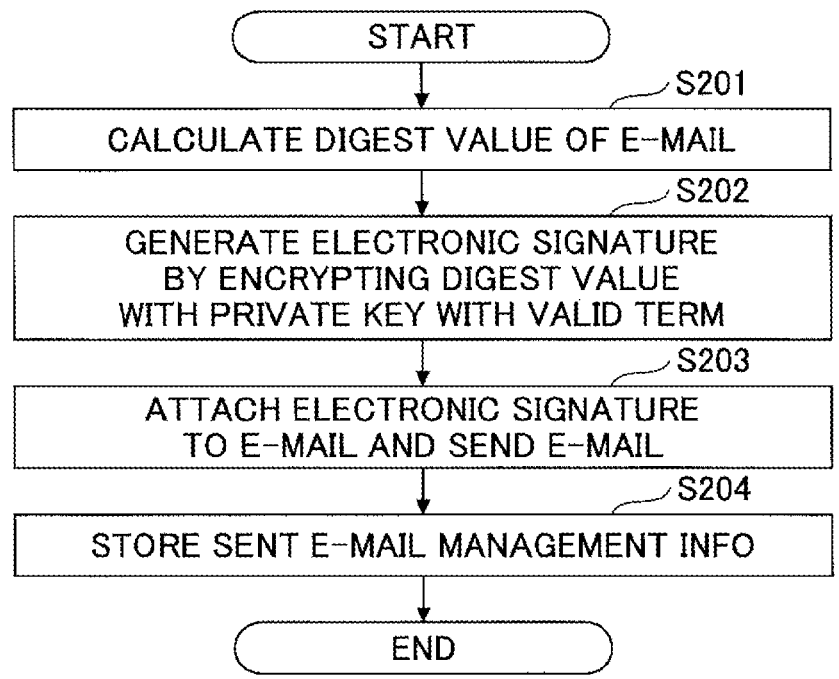
FIG. 5 is a flowchart illustrating an example of process steps executed by a sender terminal when sending an e-mail according to the first embodiment.
FIG. 6 is a schematic view illustrating an example of a configuration of a paired-keys storage section according to the first embodiment.

FIG. 5 is a flowchart illustrating an example of process steps executed by the sender terminal 10a when sending an e-mail according to the first embodiment. Namely, FIG. 5 illustrates an example of process steps executed when sending the e-mails at Steps S101, S111, and S121 in FIG. 4.

At Step S201, the electronic signature generation section 111 of the sender terminal 10a calculates a digest value of an e-mail to be sent using a predetermined hash function. Next, the electronic signature generation section 111 generates an electronic signature by encrypting the calculated digest value with a private key with a valid term including the current date and time (Step S202). The private key with the valid term is obtained from the paired-keys storage section 116.

FIG. 6 is a schematic view illustrating an example of a configuration of the paired-keys storage section 116 according to the first embodiment. The paired-keys storage section 116 illustrated in FIG. 6 stores pairs of private keys and public keys that constitute paired keys and their valid term for each pair of keys. When a valid term is represented with "until 8/13", it means August, 13th is the end date of the valid term. When a valid term is represented with "from 8/14", it means August, 14th is the start date of the valid term.

Therefore, at Step S202, if a current date is August, 13th, the private key k is used. On the other hand, if the current date is August, 14th, the private key n is used.

Next, the e-mail transmission section 112 attaches an electronic signature to the e-mail, then sends the e-mail (Step S203).

Figures 7, 8:
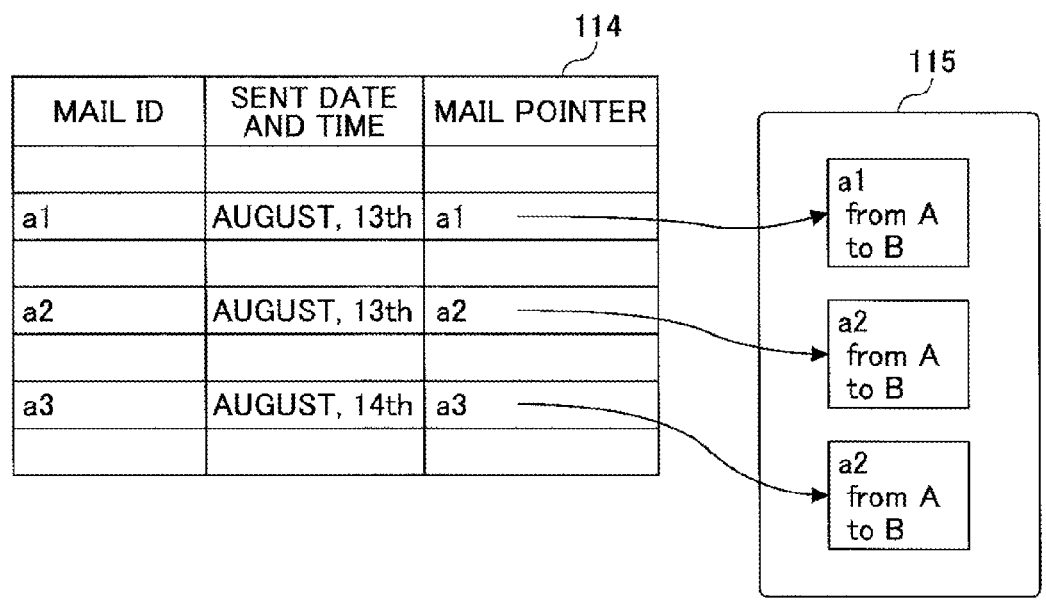
FIG. 7 is a schematic view illustrating an example of a configuration of an e-mail according to the first embodiment.
FIG. 8 is a schematic view illustrating an example of a configuration of a sent e-mail management information storage section according to the first embodiment.

FIG. 7 is a schematic view illustrating an example of a configuration of an e-mail according to the first embodiment. In FIG. 7, an e-mail includes a creation date and time, a source address, a destination address, a mail ID, a body, an electronic signature, and the like. Among these, a part excluding the electronic signature is called an "entity part" in the following.

The creation date and time are the creation date and time of an e-mail. The source address is an e-mail address of the sender of the e-mail. The destination address is an e-mail address of the recipient of the e-mail. The mail ID is identification information of the e-mail. The body is the body text of the e-mail. The electronic signature is an encrypted value of the digest value of the entity part with a private key (private key k in FIG. 7).

Next, the e-mail transmission section 112 stores sent e-mail management information about the e-mail being sent in the sent e-mail management information storage section 114 (Step S204).

FIG. 8 is a schematic view illustrating an example of a configuration of the sent e-mail management information storage section 114 according to the first embodiment. In FIG. 8, the sent e-mail management information storage section 114 stores a mail ID, sent date and time, a mail pointer, and the like, for each e-mail that is sent. The mail ID is ID of the e-mail that is sent. The sent date and time are the date and time when the e-mail is sent. The mail pointer is a link to an address of a storage area where the sent e-mail is stored in the sent e-mail storage section 115. Here, FIG. 8 illustrates a state when Step S121 in FIG. 4 is completed.

Figure 9:
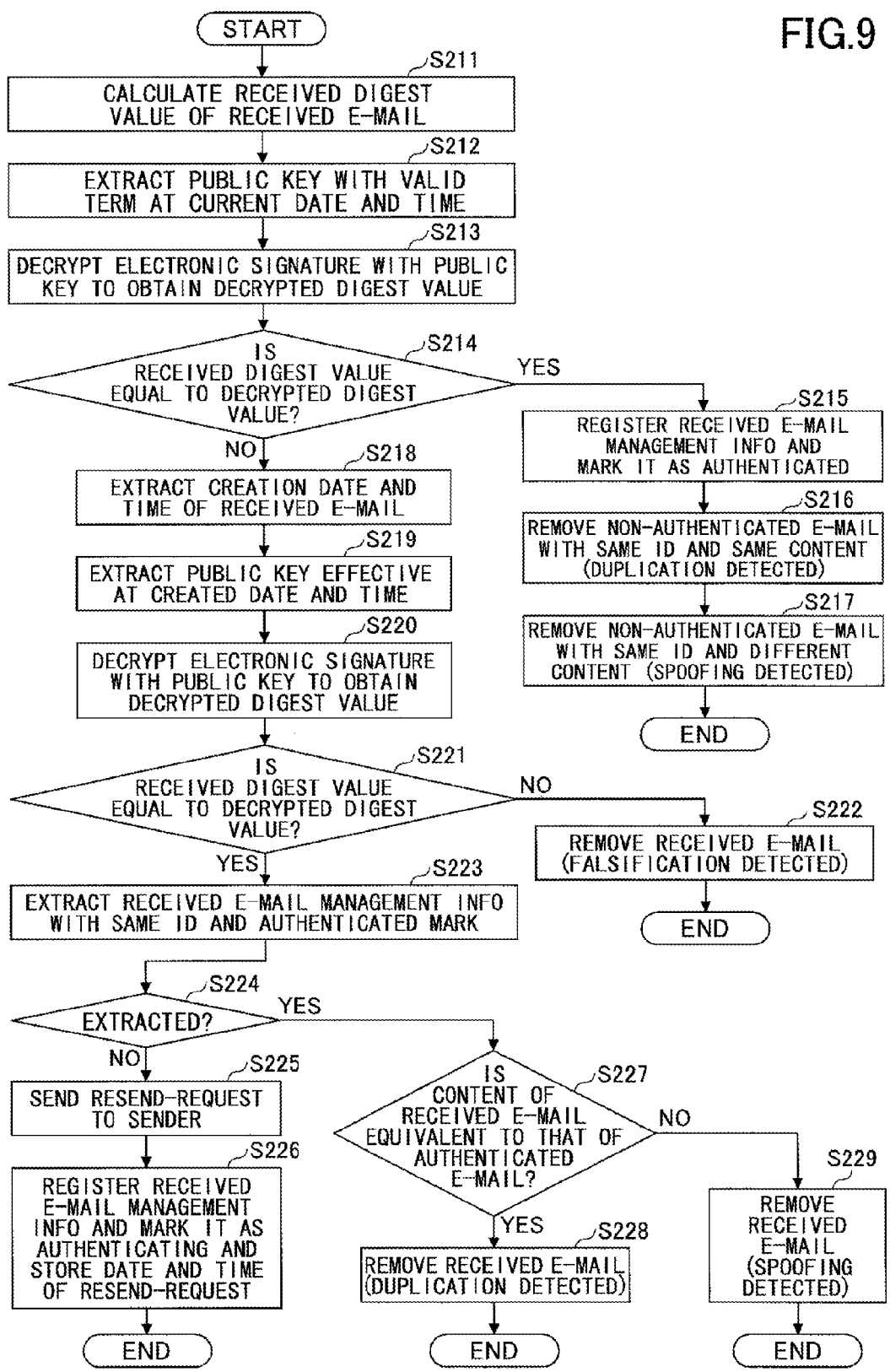
FIG. 9 is a flowchart for describing an example of process steps executed by a recipient terminal in response to receiving an e-mail according to the first embodiment.

Next, FIG. 9 is a flowchart for describing an example of process steps executed by the recipient terminal 10b in response to receiving an e-mail according to the first embodiment. Namely, FIG. 9 illustrates an example of process steps executed by the recipient terminal 10b at Steps S104, S114, S124, S133, S143, and the like.

If an e-mail is received by the e-mail reception section 121 of the recipient terminal 10b, the public key identification section 122 calculates a digest value of the entity part (called the "received digest value", hereafter) of the e-mail (called the "received e-mail", hereafter) (Step S211). Next, the public key identification section 122 obtains a public key that has a valid term including the current date and time from the public key storage section 128 (Step S212).

FIG. 10 is a schematic view illustrating an example of a configuration of the public key storage section 128 according to the first embodiment. For each public key corresponding to the private key used for generating an electronic signature, the public key storage section 128 stores the sender ID, the public key, the valid term, and the like. The sender ID is identification information about a valid sender who has the private key corresponding to the public key. The sender ID may be, for example, an e-mail address of the sender. The public key is the entity part of the public key. The valid term is the valid term of the public key. The valid term is equivalent to the valid term of the corresponding private key. Here, in the FIG. 10, the valid term is not set for a public key having the sender ID 'D'. This exemplifies existence of a public key not having the valid term set.

At Step S212, a public key that has the valid term including current date and time is obtained by the public key storage section 128 among public keys corresponding to the source address of the received e-mail. Therefore, if the sender of the received e-mail is the sender A and the current date is August, 13th, the public key K is obtained. On the other hand, if the current date is August, 14th, the public key N is obtained.

Next, the public key identification section 122 obtains a digest value by decrypting the electronic signature attached to the received e-mail by the obtained public key (called a "decrypted digest value", hereafter) (Step S213). Next, the public key identification section 122 compares the received digest value with the decrypted digest value to determine whether both values are equivalent (Step S214).

If both values are equivalent (Step S214 YES), the public key obtained at Step S212 is identified as the public key corresponding to the electronic signature of the received e-mail that matches the private key constituting a paired key used for generating the electronic signature. In this case, the validity determination section 123 registers received e-mail management information of the received e-mail into the received e-mail management information storage section 126 (Step S215).

Figure 11:
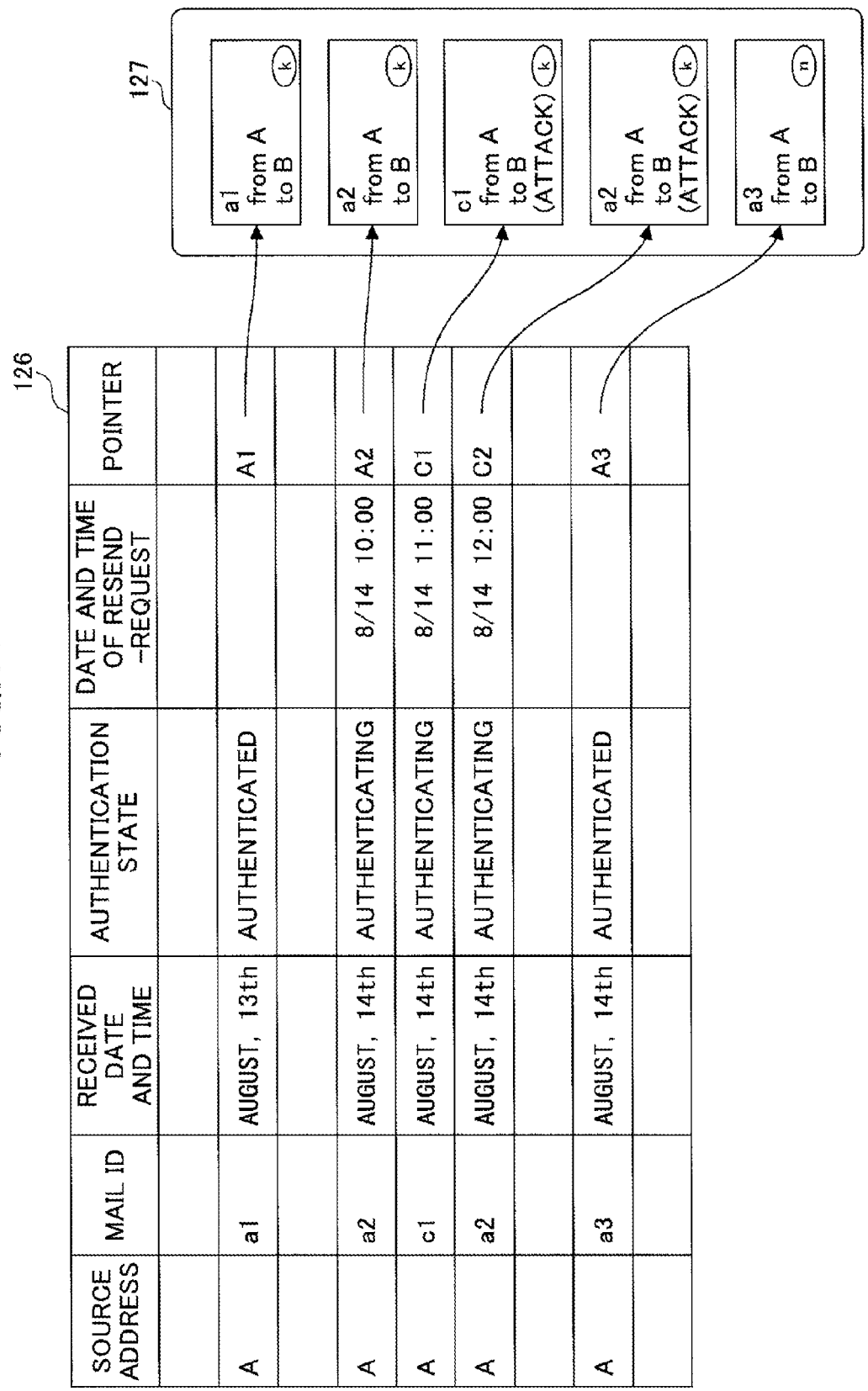
FIG. 11 is a schematic view illustrating an example of a configuration of a received e-mail management information storage section according to the first embodiment.

FIG. 11 is a schematic view illustrating an example of a configuration of the received e-mail management information storage section 126 according to the first embodiment. In FIG. 11, the received e-mail management information storage section 126 stores a source address, a mail ID, received date and time, an authentication state, resend-request date and time, a pointer, and the like for each e-mail that is received.

The source address is the source address of a received e-mail. The mail ID is the mail ID included in the received e-mail. The received date and time are the date and time when the received e-mail is received. The authentication state is an authentication state of validity of the sender of the received e-mail or the received e-mail itself. The resend-request date and time are the date and time when a resend-request e-mail is sent if the resend-request e-mail is sent for the received e-mail. The pointer is a link to an address of a storage area where the received e-mail is stored in the received e-mail storage section 127. Here, FIG. 11 illustrates a state when Step S153 in FIG. 4 is completed.

At Step S215, the received e-mail is stored in the received e-mail storage section 127, and the received e-mail management information of the received e-mail including a pointer to the storage area is stored in the received e-mail management information storage section 126. The validity determination section 123 also sets the authentication state of the received e-mail management information as "authenticated". An "authenticated" state is a state in which validity of the sender of a received e-mail is confirmed (authenticated). Namely, the authenticity of the sender and the received e-mail itself is determined as valid because the public key corresponding to the electronic signature of a received e-mail is within the valid term.

Next, if there is a non-authenticated e-mail among e-mails received in the past that has the same mail ID as the received e-mail, the validity determination section 123 removes the received e-mail and the received e-mail management information of the received e-mail (Steps S216 and S217). A non-authenticated e-mail is an e-mail whose authentication state value is set to "authenticating".

More specifically, if the entity part of an e-mail to be removed is the same as that of the received e-mail registered at Step S215 (called the "valid received e-mail", hereafter), it is removed at Step S216 to exclude a duplicate e-mail. In this case, the e-mail to be removed is an authenticated e-mail. Therefore, Step S216 may not be executed if a duplicate e-mail is allowed. On the other hand, if the entity part of the e-mail to be removed is different from the entity part of the authenticated received e-mail, it is treated as detection of spoofing, and the e-mail is removed at Step S217.

At Step S214, if the received digest value is not equal to the decrypted digest value (Step S214 NO), the public key identification section 122 extracts the creation date and time of the received e-mail (Step S218). Next, the public key identification section 122 obtains a public key whose valid term includes the creation date and time from the public key storage section 128 (Step S219). Next, the public key identification section 122 obtains a digest value by decrypting the electronic signature of the received e-mail by the public key (called a "decrypted digest value", hereafter) (Step S220). Next, the public key identification section 122 compares the received digest value with the decrypted digest value to determine whether both these values are equivalent (Step S221).

If both these values are different (Step S221 NO), the public key identification section 122 removes the received e-mail (Step S222). This is because there is likelihood that the received e-mail has been falsified.

On the other hand, if the received digest value is equivalent to the decrypted digest value (Step S221 YES), the public key obtained at Step S219 is identified as the public key corresponding to the electronic signature of the received e-mail that matches with the private key used for generating the electronic signature. Namely, the electronic signature of the received e-mail is determined as expired. In this case, the validity determination section 123 extracts received e-mail management information that has the same mail ID as the received e-mail and the authentication state of "authenticated" from the received e-mail management information storage section 126 (Step S223).

If the corresponding received e-mail management information is not extracted (Step S224 NO), the resend-request transmission section 124 sends a resend-request e-mail to the source address of the received e-mail (Step S225).

FIG. 12 is a schematic view illustrating an example of a configuration of a resend-request e-mail according to the first embodiment. In FIG. 12, a resend-request e-mail includes creation date and time, a source address, a destination address, a mail ID, a body, an electronic signature, and the like.

The creation date and time are the creation date and time of a resend-request e-mail. The source address is an e-mail address of the sender of the resend-request e-mail, which is the e-mail address of the recipient B in the present embodiment. The destination address is a destination e-mail address of the resend-request e-mail, which is the e-mail address of the sender A in the present embodiment. The mail ID is the mail ID of the resend-request e-mail. The electronic signature is an encrypted value of the digest value of the entity part of the resend-request with a private key (private key k in FIG. 7). The body is the body text of the resend-request e-mail. The body of a resend-request e-mail has a predetermined format. Specifically, the body of the resend-request e-mail includes a keyword "RESEND-REQUEST" designating that it is a resend-request, the mail ID of the received e-mail relevant to the resend-request, the electronic signature attached to the received e-mail, and the like.

Here, Step S225 corresponds to Steps S151-S153 in FIG. 4.

Next, the validity determination section 123 registers received e-mail management information of the received e-mail into the received e-mail management information storage section 126 (FIG. 11) (Step S226). The authentication state of the received e-mail management information is set as "authenticating". Also, the date and time when the resend-request e-mail is sent is stored in the resend-request date and time of the received e-mail management information. Here, an "authenticating" state is a state in which validity of a received e-mail or the sender of a received e-mail is being confirmed.

On the other hand, if the corresponding received e-mail management information is extracted at Step S223 (Step S224 YES), the validity determination section 123 determines whether the content of the received e-mail (entity part) is equivalent to the content of the authenticated e-mail stored as the received e-mail management information (called the "authenticated mail", hereafter) (Step S227). If both these contents are equivalent (Step S227 YES), it is determined that the received e-mail is duplicate with the authenticated e-mail, hence the validity determination section 123 removes the received e-mail (Step S228). However, if duplication is allowed, the received e-mail may not be removed, which is similar to Step S216.

On the other hand, if the content of the received e-mail is different from the content of the authenticated e-mail (Step S227 NO), the validity determination section 123 determines that the received e-mail is a spoofing e-mail. Thereupon, the validity determination section 123 removes the received e-mail (Step S229). Here, the spoofing e-mail and its relevant information may be stored to be used for, for example, analyzing a pattern of spoofing and the like.

Here, in FIG. 4, the e-mail a1 (A1) and e-mail a3 (A3) are registered in the received e-mail management information storage section 126 at Step S215. For the e-mail a2 (A2), e-mail c1 (C1), and e-mail a2 (C2), Steps S225 and S226 are executed.

Here, if the e-mail a2 (A2) is received by the recipient terminal 10b by the end of August, 13th, the e-mail a2 (A2) is registered in the received e-mail management information storage section 126 as authenticated at Step S215. In this case, spoofing is detected for the e-mail a2 (C2) at Step S229.

Figure 13:
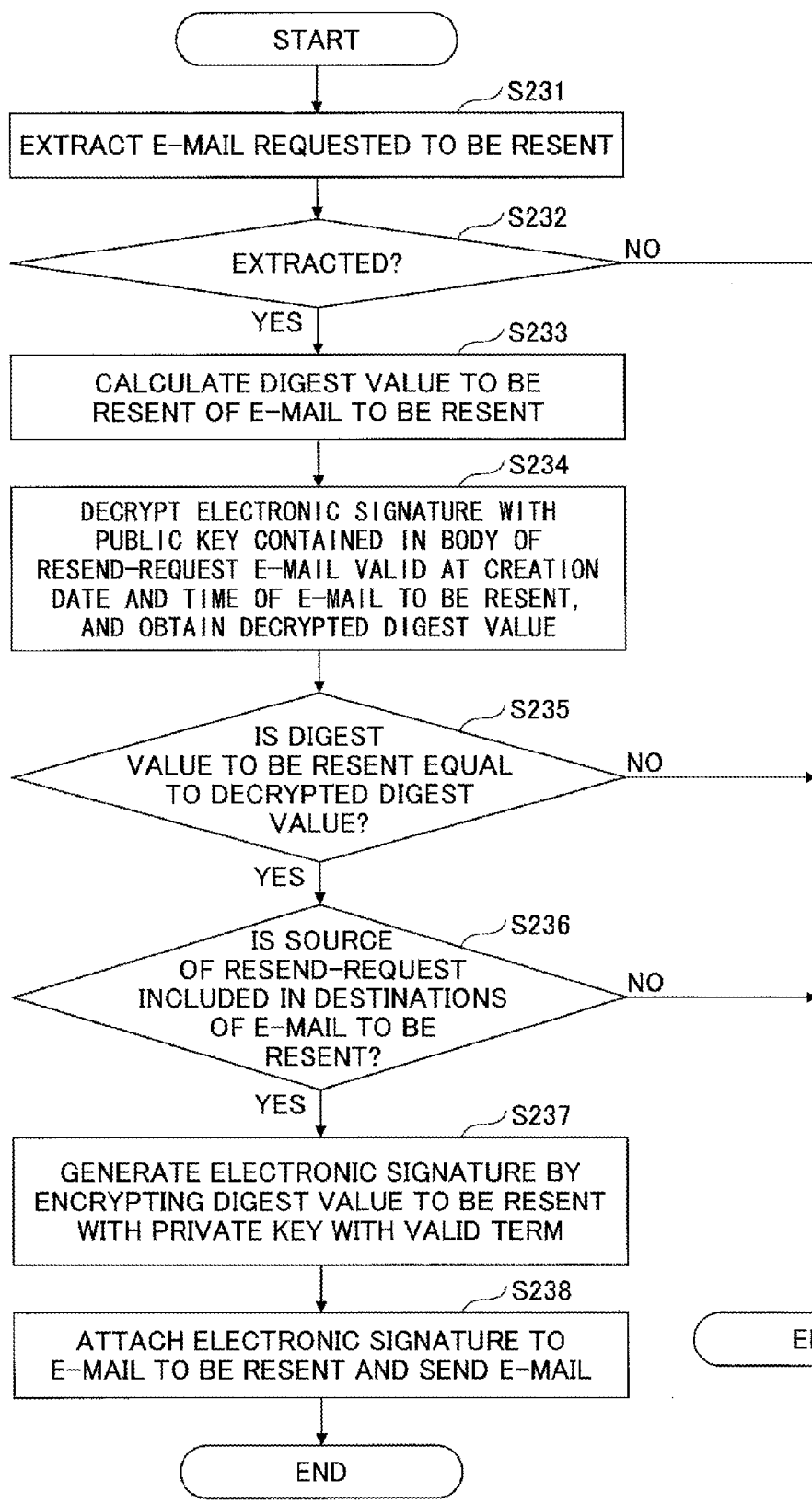
FIG. 13 is a flowchart for describing an example of process steps executed by a sender terminal in response to receiving a resend-request e-mail according to the first embodiment.

Next, FIG. 13 is a flowchart for describing an example of process steps executed by the sender terminal 10a in response to receiving a resend-request e-mail according to the first embodiment. Namely, FIG. 13 illustrates an example of process steps executed by the sender terminal 10a that correspond to Steps S151, S152, and S153 in FIG. 4.

At Step S231, the resend-request response section 113 extracts an e-mail whose mail ID is described in the body of the received resend-request e-mail (FIG. 12) with reference to the sent e-mail management information storage section 114. Namely, a corresponding e-mail is obtained from sent e-mail management information stored in the sent e-mail management information storage section 114 based on the mail pointer of the sent e-mail management information including the mail ID.

If the corresponding e-mail is obtained (called the "e-mail to be resent", hereafter) (Step S232 YES), the resend-request response section 113 calculates a digest value of the entity part of the e-mail to be resent (called a "digest value to be resent", hereafter) (Step S233). Next, the resend-request response section 113 obtains a digest value by decrypting the electronic signature included in the body of the resend-request e-mail by the public key valid at the creation date and time of the e-mail to be resent (called a "decrypted digest value", hereafter) (Step S234). Here, the creation date and time of the e-mail to be resent refer to the creation date and time when the e-mail to be resent has sent for the first time. Also, the public key valid at the create date and time of the e-mail to be resent can be obtained from the paired-keys storage section 116.

Next, the resend-request response section 113 compares the digest value to be resent with the decrypted digest value to determine whether both these values are equivalent (Step S235). Namely, it is determined that the content of the e-mail to be resent is equivalent to the content of the e-mail that is requested to be resent.

If both these values are equivalent (Step S235 YES), the resend-request response section 113 determines that the source address of the resend-request e-mail is included in the destination addresses of the e-mail to be resent (Step S236). If the source address of the resend-request e-mail is included in the destination addresses of the e-mail to be resent (Step S236 YES), the electronic signature generation section 111 generates an electronic signature by encrypting the digest value to be resent by a private key whose valid term includes the current date and time (Step S237). The private key is obtained from the paired-keys storage section 116 (FIG. 6). Next, the e-mail transmission section 112 attaches the electronic signature to the e-mail to be resent, then sends the e-mail (Step S238). Namely, the e-mail relevant to the resend-request is resent.

Figures 14, 15:
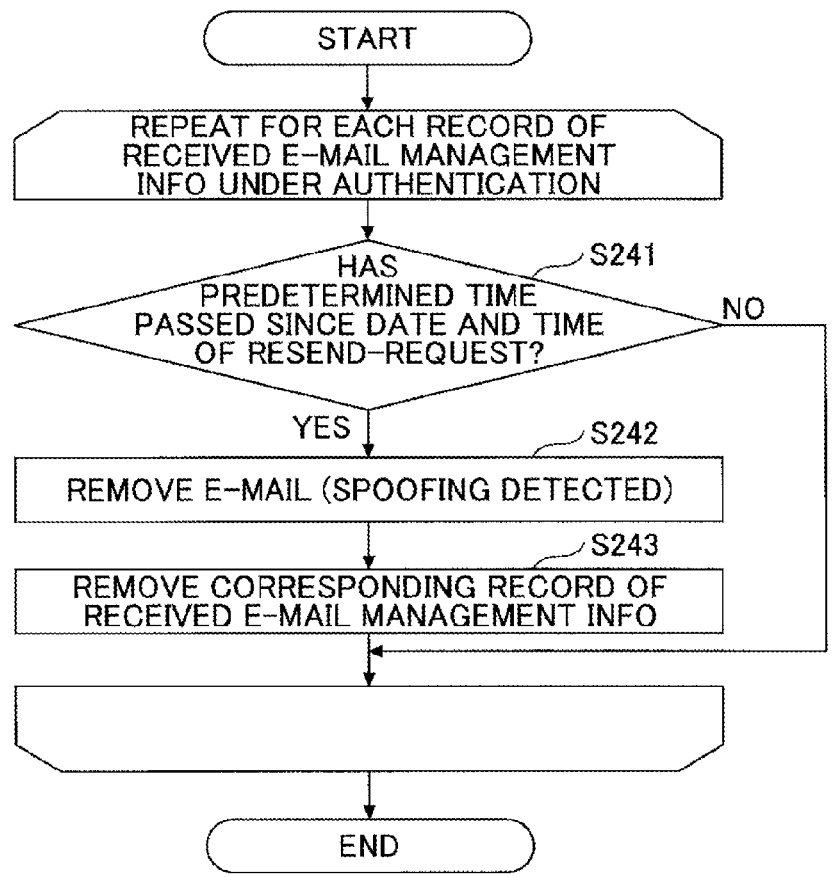
FIG. 14 is a schematic view illustrating an example of a configuration of an e-mail to be resent according to the first embodiment.
FIG. 15 is a flowchart for describing an example of process steps executed by a recipient terminal for detecting an invalid e-mail according to the first embodiment.

FIG. 14 is a schematic view illustrating an example of a configuration of an e-mail to be resent according to the first embodiment. FIG. 14 illustrates an example of a configuration of an e-mail to be resent when an e-mail configured as in FIG. 7 (called the "original e-mail", hereafter) is to be resent. The entity part of the e-mail to be resent is the same as the entity part of the original e-mail. For example, the creation date and time of the e-mail to be resent are the same as the creation date and time of the original e-mail. On the other hand, the electronic signature of the e-mail to be resent differs from the electronic signature of the original e-mail. This is because the electronic signature of the e-mail to be resent is generated using a private key valid at the time of resending.

If the e-mail to be resent is received at the recipient terminal 10b, the recipient terminal 10b executes the procedure described in FIG. 9. If the e-mail to the resent is received within the valid term of the electronic signature of the e-mail to be resent, Step S215 is executed for the e-mail to be resent. In this case, new received e-mail management information does not need to be registered. Instead, the authentication state of the received e-mail management information is changed from "authenticating" to "authenticated" which was originally stored as a part of the received e-mail management information when Step S226 has been executed for the original e-mail.

On the other hand, an e-mail is not resent responding to the resend-request if an e-mail to be resent is not obtained at Step 231 (Step S232 NO), or the digest value to be resent is not equal to the decrypted digest value (Step S235 NO), or the source address of the resend-request e-mail is not included in the destination addresses of the e-mail to be resent (Step S236 NO).

Here, in FIG. 4, for the resend-request e-mail that requests resending of the e-mail a2 (A2), Steps S237 and S238 are executed. Consequently, the e-mail a2 (A2) is resent. For the resend-request that requests resending of the e-mail c1 (C1), it is determined as NO at Step S232, and resending is not executed.

Next, FIG. 15 is a flowchart for describing an example of process steps executed by the recipient terminal 10b for detecting an invalid e-mail according to the first embodiment. In FIG. 15, Steps S241-S243 are executed for records of received e-mail management information whose authentication state is "authenticating" in the received e-mail management information storage section 126 (FIG. 11).

At Step S241, the validity determination section 123 determines whether a predetermined time has passed since the resend-request date and time of the received e-mail management information to be processed. The predetermined time is set beforehand. If the predetermined time has passed since the resend-request date and time (Step S241 YES), the validity determination section 123 determines that the received e-mail relevant to the received e-mail management information is not valid. Thereupon, the invalid e-mail removal section 125 removes the received e-mail that is identified by the pointer in the received e-mail management information (Step S242). Next, the invalid e-mail removal section 125 removes the received e-mail management information from the received e-mail management information storage section 126 (Step S243). Consequently, the invalid received e-mail that has been made by spoofing is removed from the received e-mails.

On the other hand, if the predetermined time has not passed since the resend-request date and time of the received e-mail management information to be processed (Step S241 NO), Steps S242 and S243 are not executed for the received e-mail management information.

For the case described in FIG. 4, the e-mail c1 (C1) and e-mail a2 (C2) are not resent. Therefore, the authentication state for these e-mails remains unchanged as "authenticating". Therefore, Steps S242 and S243 are executed for these e-mails. Consequently, the e-mail c1 (C1) and e-mail a2 (C2) are removed from the recipient terminal 10b. However, as described above, invalid e-mails do not necessarily need to be removed.

Here, the procedure in FIG. 15 may be executed periodically if a record of received e-mail management information whose authentication state is "authenticating" is stored in the received e-mail management information storage section 126, or may be unconditionally executed periodically.

As described above, according to the first embodiment, if the valid term of the electronic signature attached to a received e-mail has expired, the received e-mail is not immediately treated as an invalid e-mail, but a resend-request for the e-mail is made. If the e-mail is resent in response to the resend-request and the electronic signature of the e-mail is within the valid term, the e-mail relevant to the resend-request is determined as valid. On the other hand, if the e-mail is not resent in response to the resend-request, the e-mail relevant to the resend-request is determined as invalid.

Therefore, it is possible to determine validity of an e-mail attached with an electronic signature whose valid term has expired.

Next, the second embodiment will be described. In the second embodiment, points that differ from those in the first embodiment will be described. Therefore, the points not specifically referred to may be the same as in the first embodiment.

Figure 16:
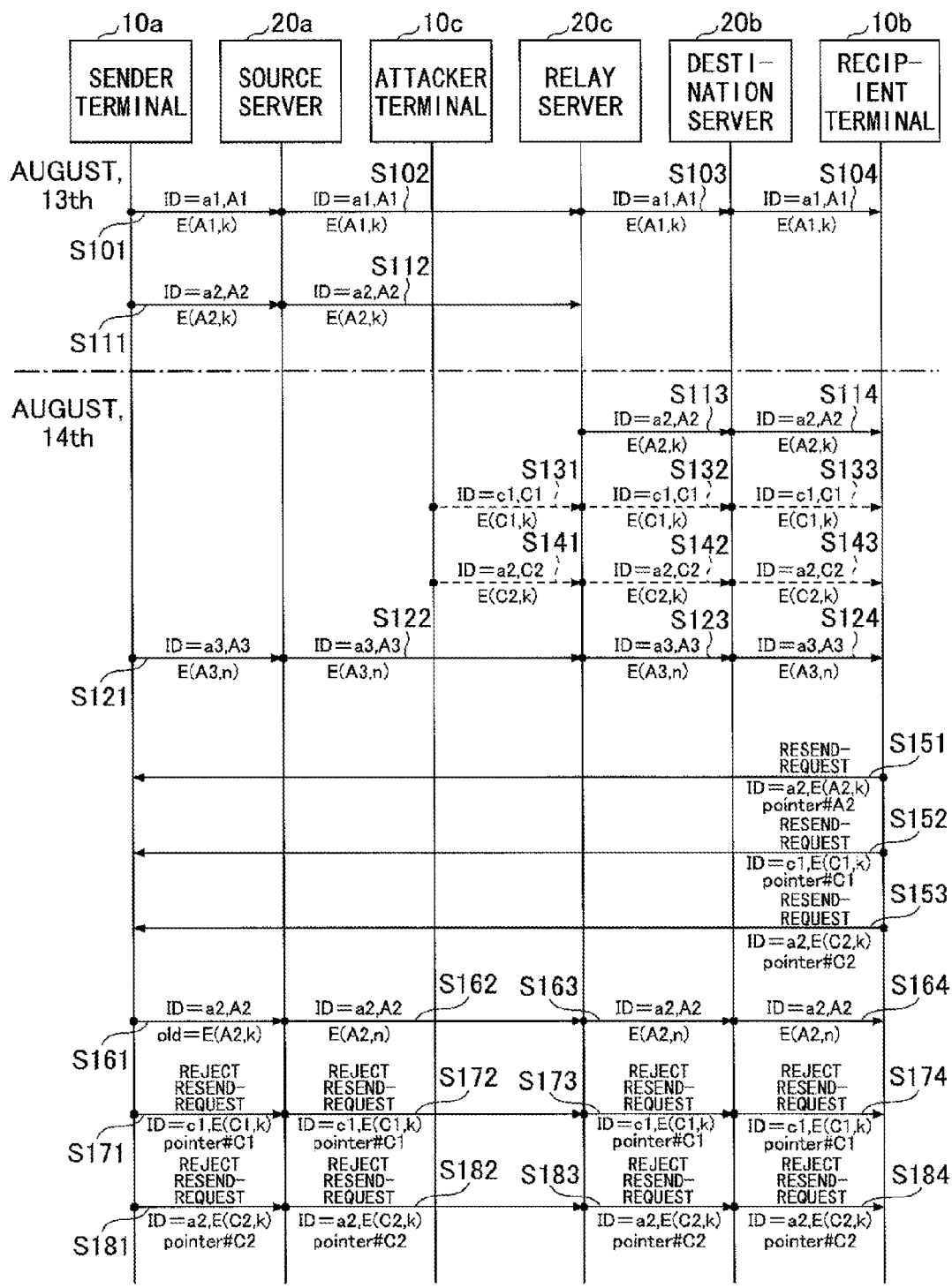
FIG. 16 is a sequence chart for describing an example of process steps executed on a mail system according to a second embodiment.

FIG. 16 is a sequence chart for describing an example of process steps executed on a mail system according to the second embodiment. In FIG. 16, the same steps as in FIG. 4 are assigned the same step numbers, and their description is omitted.

According to the second embodiment, if the sender terminal 10a receives a resend-request e-mail for an e-mail that has not been sent from the sender terminal 10a in the past, the sender terminal 10a sends a resend-rejection e-mail to the sender of the resend-request e-mail that indicates rejection of the resending request. Therefore, the sender terminal 10a sends resend-rejection e-mails for the e-mail c1 (C1) and e-mail a2 (C2), respectively (Steps S171 and S181). The resend-rejection e-mails are received by the recipient terminal 10b via the source server 20a, the relay server 20c, and the destination server 20b (Steps S172-S174 and S182-S184).

The recipient terminal removes received e-mails for which resend-requests have been made and resend-rejection e-mails are received among received e-mails.

According to the second embodiment, the configuration of a resend-request e-mail differs from that according to the first embodiment. FIG. 17 is a schematic view illustrating an example of the configuration of a resend-request e-mail according to the second embodiment.

The resend-request e-mail illustrated in FIG. 17 differs from the resend-request e-mail illustrated in FIG. 12 in that the body includes a received e-mail pointer. The value of a received e-mail pointer is, for example, the value of the pointer for the received e-mail relevant to the resend-request that is stored in the received e-mail management information storage section 126 of the recipient terminal 10b. Here, the value of a received e-mail pointer is not limited to the pointer of the received e-mail management information as long as it is a value that can identify each e-mail received at the recipient terminal 10b.

Also, according to the second embodiment, a part of the process steps executed by the sender terminal 10a in response to receiving a resend-request e-mail differs from that according to the first embodiment (FIG. 13).

Figure 18:
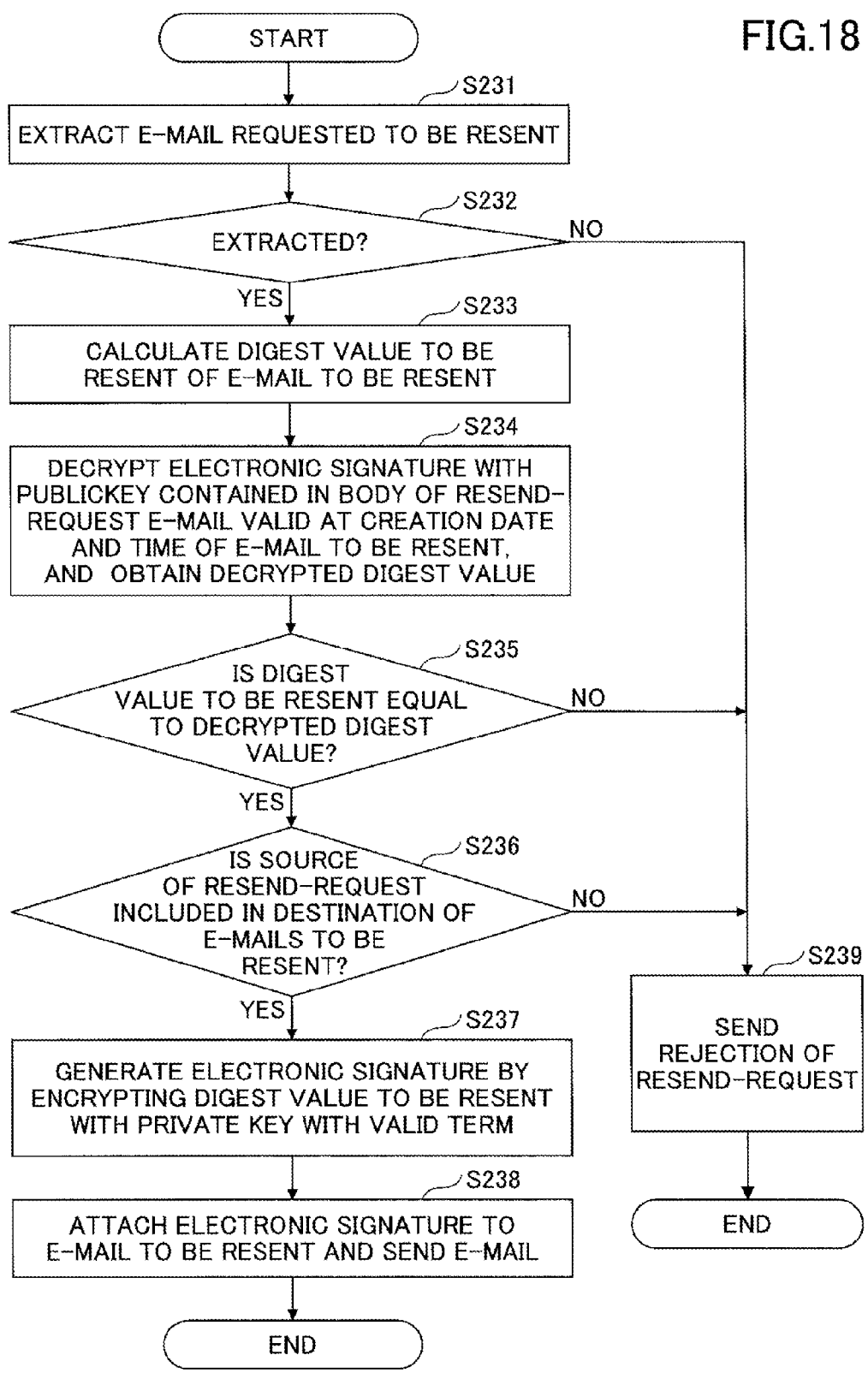
FIG. 18 is a flowchart for describing an example of process steps executed by a sender terminal in response to receiving a resend-request e-mail according to the second embodiment.

FIG. 18 is a flowchart for describing an example of process steps executed by the sender terminal 10a in response to receiving a resend-request e-mail according to the second embodiment. In FIG. 18, the same steps as in FIG. 13 are assigned the same step numbers, and their description is omitted.

In FIG. 18 if an e-mail to be resent is not obtained (Step S232 NO), or the digest value to be resent is not equivalent to the decrypted digest value (Step S235 NO), or the source address of the resend-request e-mail is not included the in the destination addresses of the e-mail to be resent (Step S236 NO), then the resend-request response section 113 sends a resend-rejection e-mail (Step S239).

Figures 19, 20:
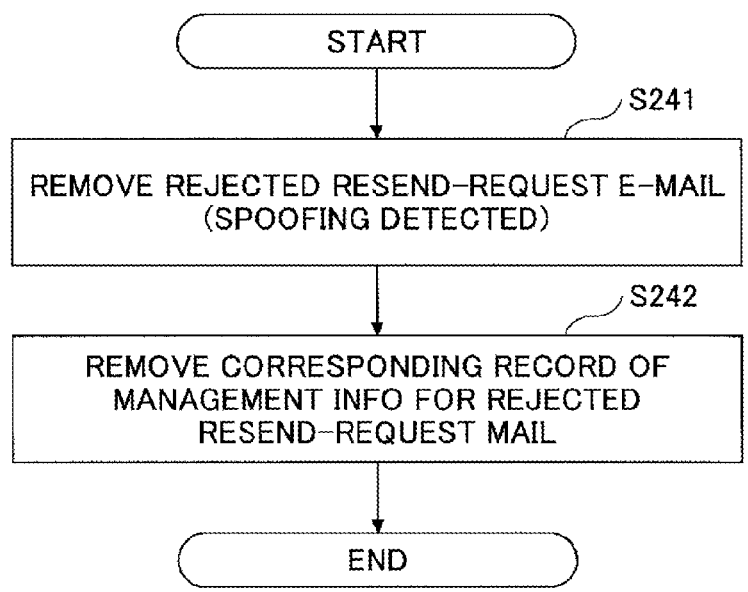
FIG. 19 is a schematic view illustrating an example of a configuration of a resend-rejection e-mail according to the second embodiment.
FIG. 20 is a flowchart for describing an example of process steps executed by a recipient terminal in response to receiving a resend-rejection e-mail according to the second embodiment.

FIG. 19 is a schematic view illustrating an example of the configuration of a resend-rejection e-mail according to the second embodiment. In FIG. 19, a resend-rejection e-mail includes creation date and time, a source address, a destination address, a mail ID, a body, an electronic signature, and the like.

The creation date and time are the creation date and time of a resend-rejection e-mail. The source address is an e-mail address of the sender of the resend-rejection e-mail. The destination address is an e-mail address of the recipient of the resend-rejection e-mail. The electronic signature is an encrypted value of the digest value of the entity part of a resend-request e-mail with a private key that is valid when the resend-request e-mail is created. The mail ID is identification information of the resend-rejection e-mail. The body is a body text of the resend-rejection e-mail. The body of a resend-rejection e-mail has a predetermined format. Specifically, the body of the resend-request e-mail includes a keyword "REJECTION OF RESEND-REQUEST" designating that it is a resend-rejection, the mail ID of the received e-mail relevant to the resend-rejection, the electronic signature attached to the received e-mail, the mail pointer of the received e-mail, and the like. Namely, the resend-request response section 113 copies the content of the body of a resend-request e-mail (FIG. 17) into the body of a resend-rejection e-mail.

In response to receiving a resent-rejection e-mail as illustrated in FIG. 19, the recipient terminal 10b executes a procedure illustrated in FIG. 20.

FIG. 20 is a flowchart for describing an example of process steps executed by the recipient terminal 10b in response to receiving a resend-rejection e-mail according to the second embodiment.

At Step S241, the invalid e-mail removal section 125 removes a received e-mail from the received e-mail storage section 127 that has been rejected to be resent. This is because there is likelihood that the received e-mail which was rejected to be resent is an spoofing e-mail. A received e-mail that has been rejected to be resent can be identified based on the value of the received e-mail pointer included in the body of the resend-rejection e-mail. Here, as there is likelihood that a mail ID is duplicated, a received e-mail that has been rejected to be resent may not always be identified based only on the mail ID. Namely, the received e-mail pointer is included in the body of a resend-request e-mail (FIG. 17) and a resend-rejection e-mail (FIG. 19) to make it possible to identify a received e-mail that has been rejected to be resent.

Next, the invalid e-mail removal section 125 removes the received e-mail management information of the received e-mail that has been rejected to be resent from the received e-mail management information storage section 126 (Step S242). The received e-mail management information of the received e-mail that has been rejected to be resent is the received e-mail management information that includes the value of the received e-mail pointer included the in the body of the resend-rejection e-mail.

Here, the procedure in FIG. 15 may not be executed according to the second embodiment.

As described above, according to the second embodiment, a resend-rejection e-mail is sent from the sender terminal 10a. Namely, it is explicitly indicated to the recipient terminal 10b whether a received e-mail is an invalid e-mail. Therefore, the recipient terminal 10b can distinguish a valid e-mail from an invalid e-mail more precisely than in the first embodiment.

Next, a third embodiment will be described. In the third embodiment, points that differ from those in the second embodiment will be described. Therefore, the points not specifically referred to may be the same as in the second embodiment.

Figure 21:
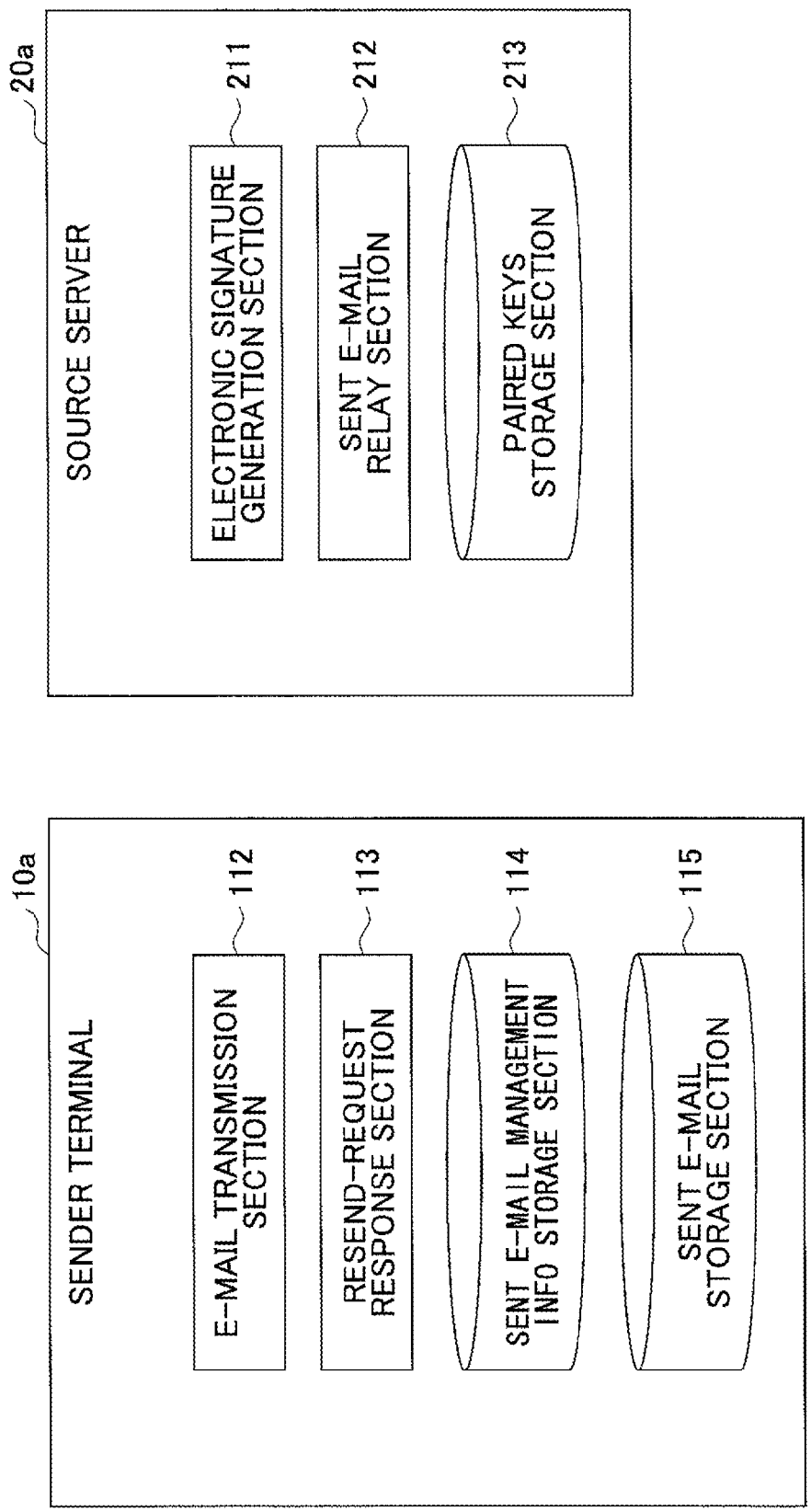
FIG. 21 is a schematic view illustrating an example of a configuration of a sender terminal and a source server according to a third embodiment.

FIG. 21 is a schematic view illustrating an example of a configuration of a sender terminal 10a and a source server 20a according to the third embodiment. In FIG. 21, the same elements as in FIG. 3 are assigned the same numeric codes, and their description is omitted.

In FIG. 21, the sender terminal 10a does not include an electronic signature generation section 111.

On the other hand, the source server 20a includes an electronic signature generation section 211, a sent e-mail relay section 212, and the like. These sections are implemented by procedures that the program installed in the source server 20a has the CPU 104 of the source server 20a execute. A paired-keys storage section 213 may be implemented by the auxiliary storage unit 102 of the source server 20a, or a storage device connected with the source server 20a via a network.

The electronic signature generation section 211 generates an electronic signature for an e-mail that is sent by the sender terminal 10a and relayed (transferred) by the source server 20a. The sent e-mail relay section 212 executes a procedure for relaying the e-mail sent by the sender terminal 10a. The paired-keys storage section 213 stores private keys and public keys similarly to the paired-keys storage section 116.

Namely, according to the third embodiment, electronic signature functions are transferred from the sender terminal 10a to the source server 20a. The electronic signature functions include a function for generating an electronic signature, a function for determining validity of an electronic e-mail that has an electronic signature attached, and the like.

Figure 22:
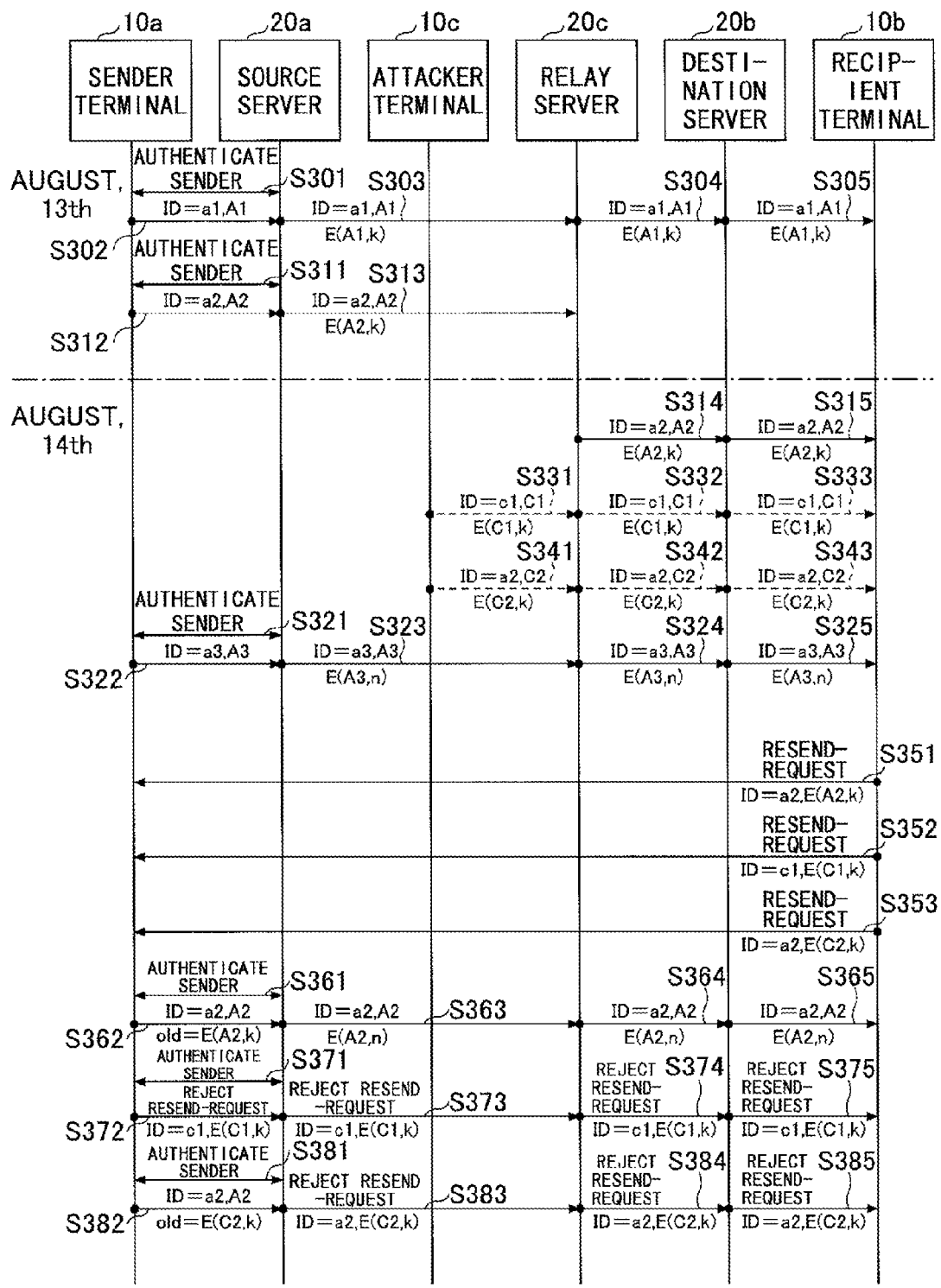
FIG. 22 is a sequence chart for describing an example of process steps executed on a mail system according to the third embodiment.

FIG. 22 is a sequence chart for describing an example of process steps executed on a mail system according to the third embodiment.

Before sending an e-mail, the sender terminal 10a is authenticated with login authentication for SMTP by the source server 20a (Steps S301, S311, and S321).

Being authenticated successfully, the sender terminal 10a sends e-mails to the recipient B (Steps S302, S312, and S322). Here, Steps S302, S312, and S322 are assumed to be executed at timings different from each other to send respective e-mails having contents different from each other.

Specifically, at Step S302, an e-mail a1 (A1) is sent at a certain time on August, 13th. At Step S312, an e-mail a2 (A2) is sent at a certain time on August, 13th, which has a mail ID a2 and content A2. At Step S322, an e-mail a3 (A3) is sent at a certain time on August, 14th, which has a mail ID a3 and content A3.

Here, according to the third embodiment, the sender terminal 10a does not include the electronic signature functions. Therefore, e-mails sent from the sender terminal 10a do not have electronic signatures attached. Thereupon, according to the third embodiment, the source server 20a attaches electronic signatures to the e-mail a1 (A1), e-mail a2 (A2), and e-mail a3 (A3), respectively.

Specifically, the e-mail a1 (A1) has an electronic signature E(A1,k) attached. The e-mail a2 (A2) has an electronic signature E(A2,k) attached. The e-mail a3 (A3) has an electronic signature E(A3,n) attached.

The e-mails having the electronic signatures attached by the source server 20a are transferred to the destination server 20b via the relay server 20c (Steps S303, S304, S313, S314, S323, and S324). Here, assume that August, 13th has passed while the relay server 20c is transferring the e-mail a2 (A2).

The recipient terminal 10b receives the e-mail a1 (A1) on August, 13th (Step S104), and receives the e-mail a2(A2) and e-mail a3 (A3) on August, 14th (Steps S315 and S325).

On the other hand, the attacker terminal 10c sends an e-mail c1 (C1) and an e-mail a2 (C2) on August, 14th to the recipient B (Steps S131 and S141), as similarly illustrated in FIG. 4. The e-mail c1 (C1) has an electronic signature E(C1, k) attached, and the e-mail a2 (C2) has an electronic signature (C2,k) attached.

The e-mail c1 (C1) and e-mail a2 (C2 ) are transferred to the destination server 20b by the relay server 20c (Steps S332 and S343). The recipient terminal 10b receives the e-mail c1 (C1) and e-mail a2(C2) on August, 14th (Steps S333 and S343).

Among e-mails received by the recipient terminal 10b, e-mails whose electronic signatures (or paired keys for the electronic signature) are expired when received at the recipient terminal 10b are the e-mail a2 (A2), e-mail c1 (C1), and e-mail a2 (C2). Thereupon, the recipient terminal 10b sends resend-request e-mails for these three e-mails to the source addresses, respectively (Steps S351, S352, and S353).

The sender terminal 10a is authenticated with login authentication by the source server 20a every time a resend-request e-mail is received at the source server 20a (Steps S361, S371, and S381). Upon successful authentication, the sender terminal 10a resends the e-mail a2 (A2) for the resend-requests for the e-mail a2 (A2) and e-mail a2 (C1) (Steps S362 and S382). Namely, the e-mail a2 (A2) is also resent for the invalid e-mail a2 (C1) that has the same mail ID. This is because the sender terminal 10a according to the third embodiment does not have the electronic signature functions, and cannot distinguish the resend-request of the e-mail a2 (A2) from the resend-request of the e-mail a2 (C1).

The e-mail a2 (A2) resent for the e-mail a2 (A2) has an electronic signature E(A2,n) attached that is generated with a private key whose valid term includes August, 14th. The resent e-mail a2 (A2) is received at the recipient terminal 10b via the source server 20a, relay server 20c, and destination server 20b by the end of August, 14th, until then, the electronic signature E(A2,n) is valid (Steps S363-S365). In response to receiving the e-mail a2 (A2), the recipient terminal 10b executes the procedure described in FIG. 9. Consequently, the authentication state of the e-mail a2 (A2) is set to "authenticated".

On the other hand, for the e-mail a2 (A2) resent for the e-mail a2 (C2), the source server 20a rejects the transfer, and sends a resend-rejection e-mail (Step S383). This is because the source server 20a has the electronic signature functions, hence can detect that the e-mail a2 (A2) is not an e-mail corresponding to the resend-request for the e-mail a2 (C2). The resend-rejection e-mail is transferred to the recipient terminal 10b via the relay server 20c and destination server 20b (Steps S384 and S385).

Also, the sender terminal 10a sends a resend-rejection e-mail for the e-mail c1 (C1) (Step S372). The resend-rejection e-mail is transferred to the recipient terminal 10b via the source server 20a, relay server 20c and destination server 20b (Steps S373-S375).

In response to receiving the resend-rejection e-mail, the recipient terminal 10b executes the procedure described in FIG. 20. Consequently, removal of the e-mail c1 (C1) and e-mail a2 (C2) is executed.

Next, an example of process steps will be described that are executed by the sender terminal 10a when sending an e-mail at Steps S302, S312, and S322 in FIG. 22.

Figures 23, 24:
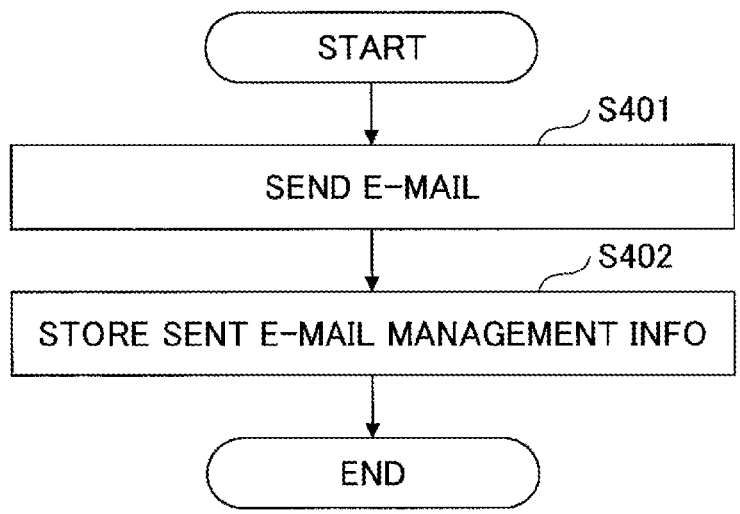
FIG. 23 is a flowchart illustrating an example of process steps executed by a sender terminal when sending an e-mail according to the third embodiment.
FIG. 24 is a schematic view illustrating an example of a configuration of an e-mail according to the third embodiment.

FIG. 23 is a flowchart illustrating an example of process steps executed by the sender terminal 10a when sending an e-mail according to the third embodiment.

At Step S401, the e-mail transmission section 112 of the sender terminal 10a sends an e-mail to be sent to the recipient B.

FIG. 24 is a schematic view illustrating an example of a configuration of an e-mail according to the third embodiment. The e-mail illustrated in FIG. 24 differs from the one in FIG. 7 in that the e-mail does not have an electronic signature attached. Other elements may be the same as in FIG. 7.

Next, the e-mail transmission section 112 stores sent e-mail management information about the sent e-mail in the sent e-mail management information storage section 114 (FIG. 8) (Step S402).

Next, process steps executed by the sender terminal 10a will be described in response to receiving a resend-request e-mail at Steps S351-S353 in FIG. 22.

Figures 25, 26:
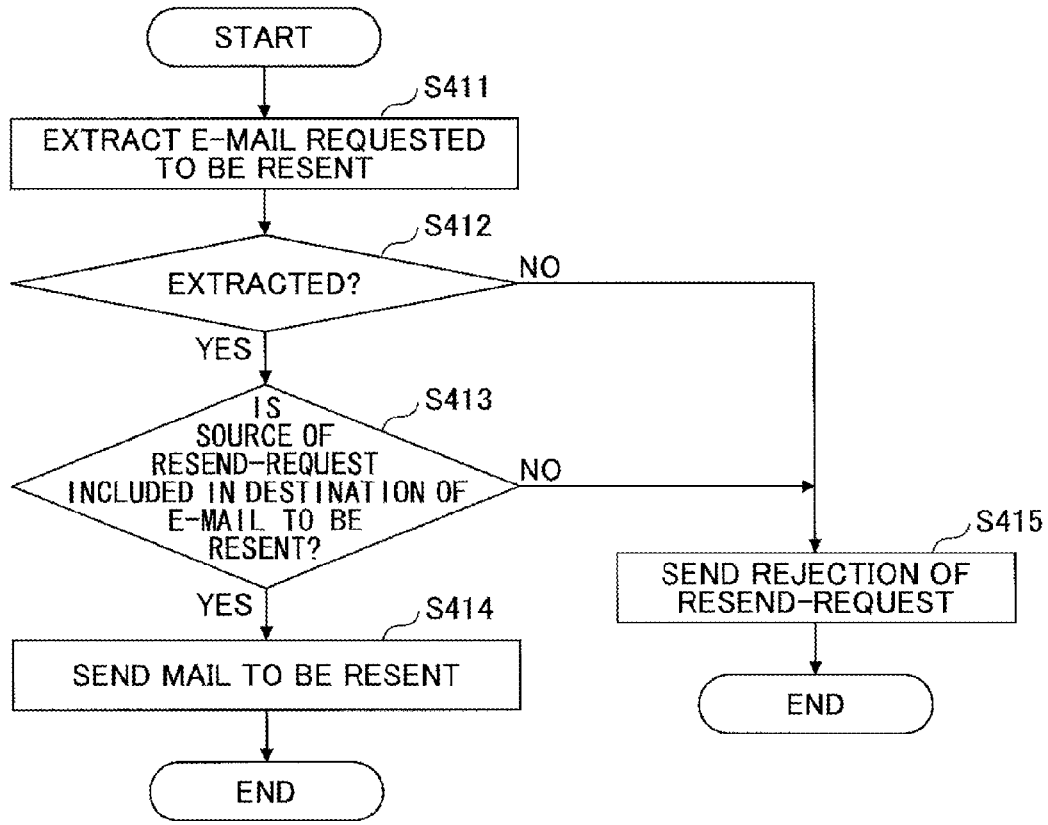
FIG. 25 is a flowchart for describing an example of process steps executed by a sender terminal in response to receiving a resend-request e-mail according to the third embodiment.
FIG. 26 is a schematic view illustrating an example of a configuration of an e-mail to be resent according to the third embodiment.

FIG. 25 is a flowchart for describing an example of process steps executed by the sender terminal 10a in response to receiving a resend-request e-mail according to the third embodiment.

At Step S411, the resend-request response section 113 extracts an e-mail whose mail ID is described in the body of the received resend-request e-mail (FIG. 17) with reference to the sent e-mail management information storage section 114.

Namely, a corresponding e-mail is obtained from the sent e-mail management information stored in the sent e-mail management information storage section 114 based on the mail pointer of the sent e-mail management information including the mail ID.

If the corresponding e-mail is obtained (called the "e-mail to be resent", hereafter) (Step S412 YES), the resend-request response section 113 determines that the source address of the resend-request e-mail is included in the destination addresses of the e-mail to be resent (Step S413). If the source address of the resend-request e-mail is included in the destination addresses of the e-mail to be resent (Step S413 YES), the e-mail transmission section 112 edits and sends the e-mail to be resent (Step S414).

FIG. 26 is a schematic view illustrating an example of a configuration of an e-mail to be resent according to the third embodiment. In FIG. 26, the resend-request e-mail has a format in which the electronic signature and the received pointer of an e-mail requested to be resent are added to the original e-mail (FIG. 24). Namely, these two pieces of data are copied from the body of the resend-request e-mail (FIG. 17) when it is edited at Step S414. Specifically, the electronic signature of the mail requested to be resent is copied from the electronic signature attached to the received e-mail requested to the resent that is included in the body of the resend-request e-mail (FIG. 17). The received e-mail pointer of the e-mail requested to be resent is copied from the value of the received e-mail pointer included in the body of the resend-request e-mail (FIG. 17).

On the other hand, if an e-mail to be resent is not obtained (Step S412 NO), or the source address of the resend-request e-mail is not included in the destination addresses of the e-mail to be resent (Step S413 NO), then the resend-request response section 113 sends a resend-rejection e-mail (Step S415).

FIG. 27 is a schematic view illustrating an example of a configuration of a resend-rejection e-mail according to the third embodiment. The resend-rejection e-mail in FIG. 27 differs from that in FIG. 19 in that it does not have the electronic signature attached. This is because the sender terminal 10a does not have the electronic signature functions according to the third embodiment. Other points are similar to those in FIG. 19. For example, the body is copied from the content of the body of the resend-request e-mail (FIG. 17).

Here, Step S414 corresponds to Steps S362 and S382 in FIG. 22. Step S415 corresponds to Step S372 in FIG. 22. Namely, in response to a resend-request e-mail for the invalid e-mail a2 (C2), the sender terminal 10a according to the third embodiment sends the e-mail a2 (A2) as an e-mail to be resent that has a common mail ID.

Next, an example of process steps in FIG. 22 executed by the source server 20a will be described in response to receiving the e-mails sent at Steps S302, S312, and S322, or the e-mail to be resent sent at Step S362, or the resend-rejection e-mails sent at Steps S372 and S382.

Figure 28:
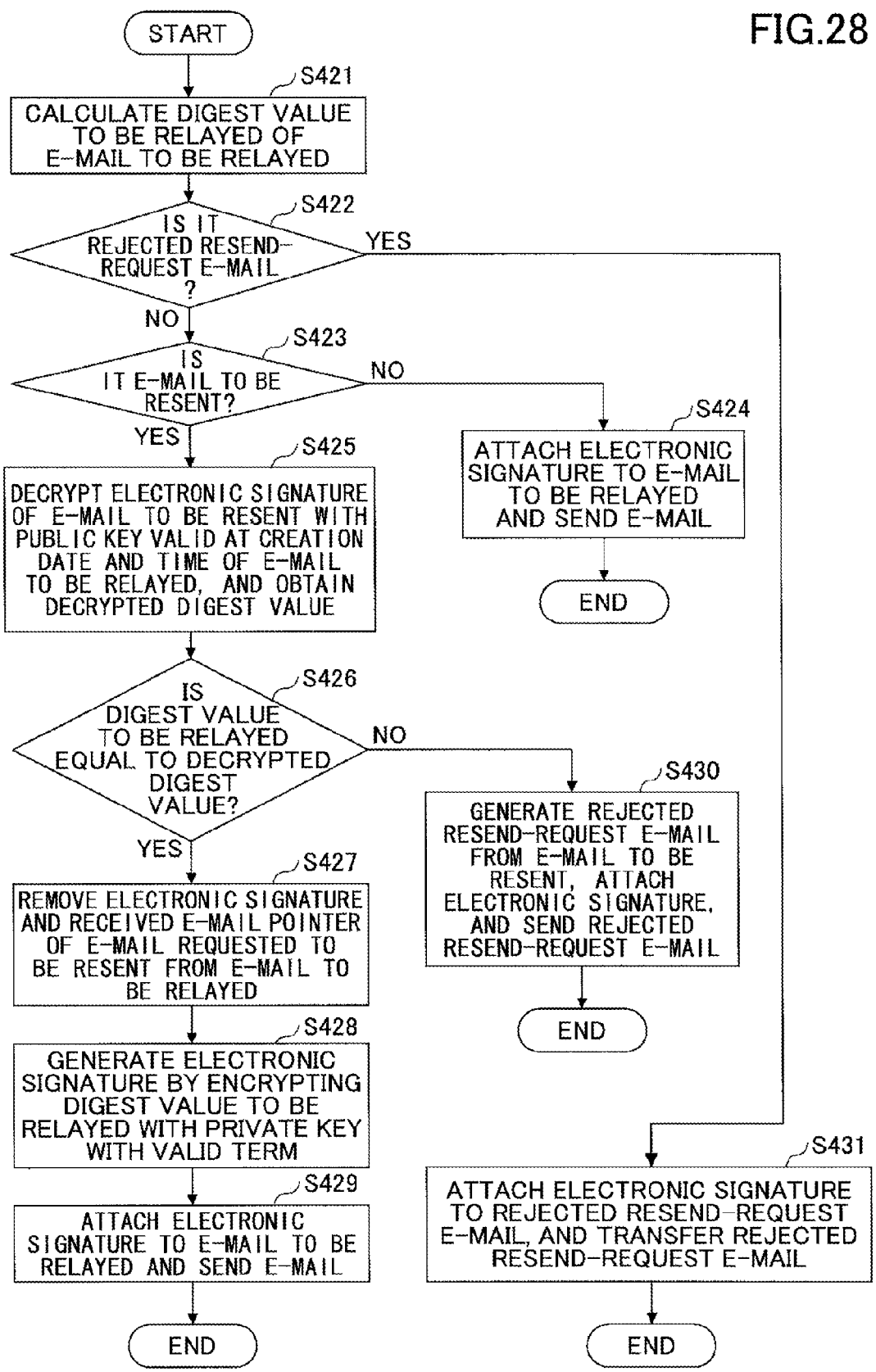
FIG. 28 is a flowchart for describing an example of process steps executed by a source server when sending an e-mail according to the third embodiment.

FIG. 28 is a flowchart for describing an example of process steps executed by the source server 20a when receiving an e-mail according to the third embodiment.

At Step S421, the sent e-mail relay section 212 of the source server 20a calculates a digest value (called a "digest value to be relayed", hereafter) of the e-mail to be relayed (called a "e-mail to be relayed" when describing with FIG. 28, hereafter). Next, the sent e-mail relay section 212 determines whether the e-mail to be relayed is a resend-rejection e-mail (Step S422). Whether the e-mail to be relayed is a resend-rejection e-mail may be determined, for example, based on whether the body of the e-mail to be relayed includes a keyword indicating a resend-rejection e-mail ("REJECTION OF RESEND-REQUEST", or the like) (see FIG. 27).

If the e-mail to be relayed is not a resend-rejection e-mail (Step S422 NO), the sent e-mail relay section 212 determines whether the e-mail to be relayed is an e-mail to be resent or an e-mail sent for the first time (called a "first e-mail", hereafter) (Step S423). The determination may be done based on differences between the configuration of an e-mail to be resent illustrated in FIG. 26 and the configuration of the first e-mail illustrated in FIG. 24. Specifically, if the e-mail to be relayed includes the electronic signature and the received e-mail pointer of the e-mail requested to the resent, the e-mail to the relayed may be determined as an e-mail to the resent, otherwise the e-mail to be relayed may be determined as a first e-mail.

If the e-mail to be relayed is a first e-mail (Step S423 NO), the sent e-mail relay section 212 attaches an electronic signature to the e-mail to be relayed and transfers the e-mail to be relayed (Step S424). The electronic signature is generated by the electronic signature generation section 211 based on the entity part of the e-mail to be relayed. The electronic signature is generated using a private key with a valid term including current date and time. The private key can be obtained from the paired-keys storage section 213. By attaching the electronic signature to the e-mail to be relayed, the e-mail to be relayed is transferred with the configuration illustrated in FIG. 7 that has had the configuration illustrated in FIG. 24 when received at the source server 20a.

Here, Step S424 corresponds to Steps S303, S313, and S323 in FIG. 22.

On the other hand, if the e-mail to be relayed is an e-mail to be resent (Step S423 YES), the sent e-mail relay section 212 obtains a digest value by decrypting the electronic signature included in the body of the e-mail to be relayed by the public key valid at the creation date and time of the e-mail to be relayed (called a "decrypted digest value", hereafter) (Step S425). Here, the public key valid at the creation date and time of the e-mail to be relayed can be obtained from the paired-keys storage section 213.

Next, the sent e-mail relay section 212 compares the digest value to be relayed with the decrypted digest value to determine whether both these values are equivalent (Step S426). Namely, it is determined whether the content of the e-mail to be relayed (mail to be resent) is equivalent to the content of the e-mail that is requested to be resent.

If the digest value to be relayed is equivalent to the decrypted digest value (Step S426 YES), the sent e-mail relay section 212 removes the electronic signature and the received e-mail pointer of the e-mail requested to the resent from the e-mail to be relayed. This is because these two pieces of data are added for the source server 20a that are not required at the recipient terminal 10b.

Next, the electronic signature generation section 211 generates an electronic signature by encrypting the digest value to be relayed with a private key with the valid term including the current date and time (Step S428). The private key within the valid term can be obtained from the paired-keys storage section 213. Next, the sent e-mail relay section 212 attaches the electronic signature to the e-mail to be relayed, and sends the e-mail to be relayed (Step S429). Namely, the e-mail to be resent having the configuration illustrated in FIG. 14 is transferred.

Here, Step S429 corresponds to Step S363 in FIG. 22.

On the other hand, if the digest value to be relayed is not equivalent to the decrypted digest value (Step S426 NO), it turns out that the e-mail to be relayed is different from the e-mail requested to be resent. Thereupon, the sent e-mail relay section 212 generates a resend-rejection e-mail having the configuration illustrated in FIG. 19 based on the e-mail to be relayed having the configuration illustrated in FIG. 26, and sends the resend-rejection e-mail (Step S430). Specifically, the creation date and time and the mail ID of the resend-rejection e-mail are set to the creation date and time when the resend-rejection e-mail is created and its mail ID, respectively. The source address and destination address of the resend-rejection e-mail are copied from the source address and destination address of the e-mail to be relayed, respectively. The body of the resend-rejection e-mail is copied with the keyword indicating resend-rejection "REJECTION OF RESEND-REQUEST", the mail ID of the e-mail to be relayed, the electronic signature of the e-mail requested to be resent included in the e-mail to be relayed, and the received e-mail pointer of the e-mail requested to be resent included in the e-mail to the relayed.

Also, as illustrated in FIG. 19, the resend-rejection e-mail has the electronic signature of the resend-rejection e-mail attached. The electronic signature is generated by encrypting the digest value to be relayed with a private key with the valid term including current date and time.

Here, Step S430 corresponds to Step S383 in FIG. 22.

On the other hand, if the e-mail to be relayed is a resend-rejection e-mail (FIG. 27) (Step S422 YES), the sent e-mail relay section 212 attaches an electronic signature to the resend-rejection e-mail, and transfers it (Step S431). Consequently, the resend-rejection e-mail having the configuration illustrated in FIG. 19 is transferred. The electronic signature is generated by encrypting the digest value to be relayed with a private key with the valid term including current date and time. Here, Step S431 corresponds to Step S373 in FIG. 22.

As described above, according to the third embodiment, the electronic signature functions of the sender terminal 10a according to the first or second embodiments is implemented at the source server 20a in a unified way. Therefore, if any one of multiple sender terminals 10a does not have the electronic signature functions, the same effect can be obtained as in the first or second embodiments.

Next, a fourth embodiment will be described. In the fourth embodiment, points that differ from those in the first embodiment will be described. Therefore, the points not specifically referred to may be the same as in the first embodiment.

Figure 29:
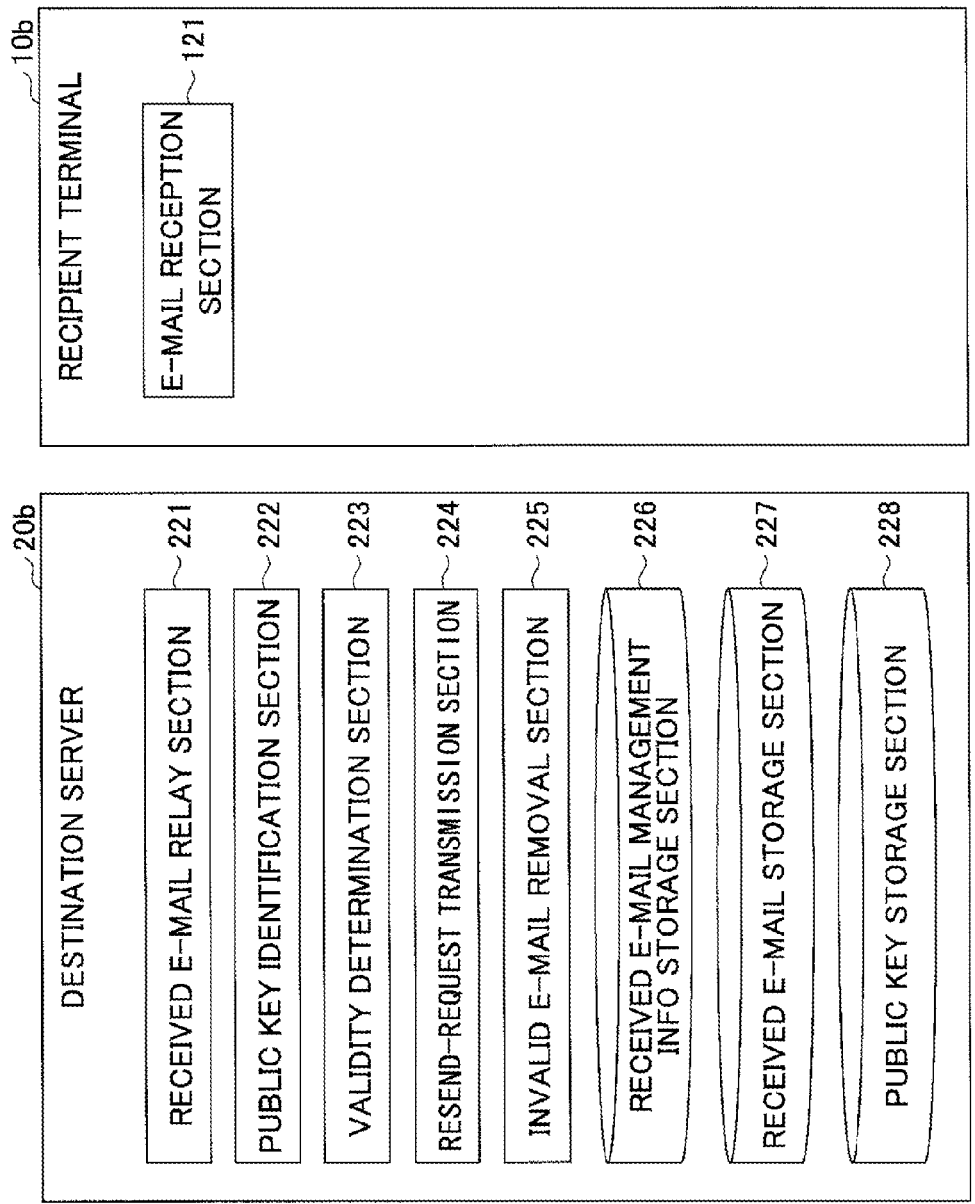
FIG. 29 is a schematic view illustrating an example of a configuration of a recipient terminal and a destination server according to a fourth embodiment.

FIG. 29 is a schematic view illustrating an example of a configuration of a recipient terminal 20b and a destination server 10b according to the fourth embodiment. In FIG. 29, the same elements as in FIG. 3 are assigned the same numeric codes, and their description is omitted.

In FIG. 29, the destination server 20b includes a received e-mail relay section 221, a public key identification section 222, a validity determination section 223, a resend-request transmission section 224, an invalid e-mail removal section 225, and the like. These sections are implemented by procedures that the program installed in the destination server 20b has the CPU 104 of the destination server 20b execute. The destination server 20b also utilizes a received e-mail management information storage section 226, a received e-mail storage section 227, a public key storage section 228, and the like. These storage sections may be implemented by the auxiliary storage unit 102 of the destination server 20b, or a storage device connected with the destination server 20b via a network.

The received e-mail relay section 221 relays an e-mail for the recipient B to the recipient terminal 10b. Namely, in response to receiving an e-mail for the recipient B, the received e-mail relay section 221 stores the e-mail and the management information of the e-mail in the received e-mail storage section 227 or the received e-mail management information storage section 226. In response to receiving a request for obtaining an e-mail from the e-mail reception section 121 of the recipient terminal 10b, the received e-mail relay section 221 replies with an e-mail that has been confirmed to be valid among e-mails stored in the received e-mail storage section 227. An e-mail that has been confirmed to be valid is an e-mail whose authentication state is set to "authenticated".

The other sections are the same as the sections having the same names in FIG. 3. Namely, according to the fourth embodiment, the function for determining validity of a received e-mail is transferred from the recipient terminal 10b to the destination server 20b.

Figure 30:
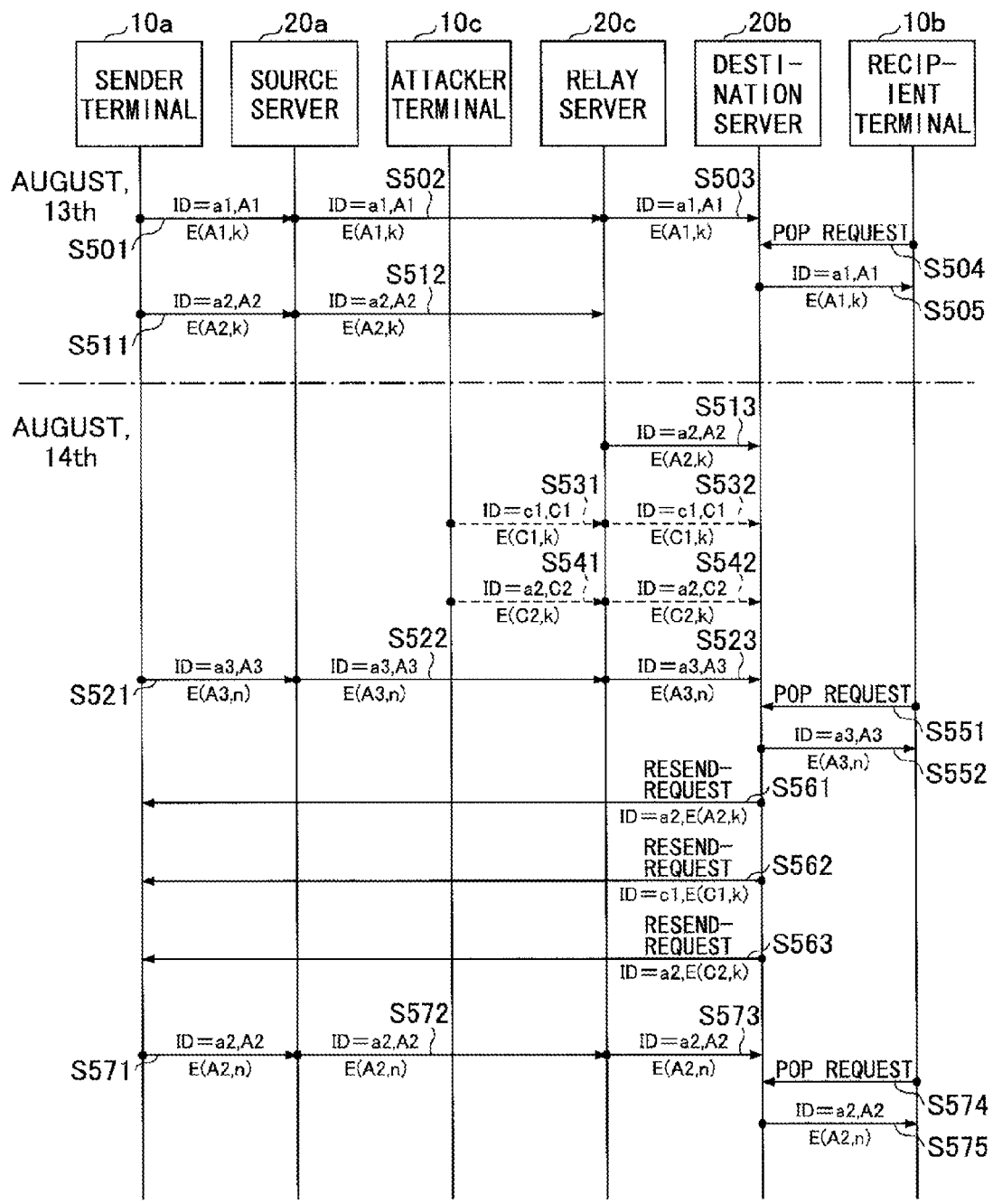
FIG. 30 is a sequence chart for describing an example of process steps executed on a mail system according to the fourth embodiment.

FIG. 30 is a sequence chart for describing an example of process steps executed on a mail system according to the fourth embodiment.

Steps S501, S511, and S521 are the same as Steps S101, S111, and S121 in FIG. 4. Namely, the sender terminal 10a executes the procedure described in FIG. 5 at Steps S501, S511, and S521. Consequently, the e-mail a1(A1), e-mail a2 (A2), and e-mail a3 (A3) are sent to the recipient B that have the configuration illustrated in the example in FIG. 7. These e-mail are transferred to the destination server 20b via the source server 20a and the relay server 20.

Steps S531 and S541 are the same as Steps S131 and S141 in FIG. 4. Namely, an attacker terminal 10c sends an e-mail c1 (C1) and an e-mail a2 (C2) to the recipient B that have the configuration illustrated in the example in FIG. 7 (Steps S531 and S541). These e-mails are transferred to the destination server 20b via the relay server 20c (Step S532 and S542).

In response to receiving the e-mail a1 (A1), e-mail a2 (A2), e-mail a3 (A3), e-mail c1 (C1), or e-mail a2 (C2), the destination server 20b executes the procedure described in FIG. 9. Consequently, these e-mails are stored in the received e-mail storage section 227. Also, the received e-mail management information of the e-mails are stored in the received e-mail management information storage section 226. Here, the steps executed by the e-mail reception section 121 in FIG. 9 are executed by the received e-mail relay section 221.

Here, the e-mail a1 (A1) and e-mail a3 (A3) are received within the valid term of the electronic signatures. Therefore, the authentication states of the e-mail a1 (A1) and e-mail a3 (A3) are set to "authenticated", respectively.

On the other hand, the e-mail a2 (A2), e-mail c1 (C1), and e-mail a2 (C2) are received out of the valid term of the electronic signatures. Therefore, the authentication states of the e-mail a2 (A2), e-mail c1 (C1), and e-mail a2 (C2) are set to "authenticating", respectively. The resend-request transmission section 224 of the destination server 20b sends resend-request e-mails for the e-mail a2 (A2), e-mail c1 (C1), and e-mail a2 (C2) to the source addresses of these e-mails, respectively (Steps S561, S562, and S563). Here, the resend-request e-mails have the configuration illustrated in the example in FIG. 12.

In response to receiving a resent-request mail, the sender terminal 10a executes the procedure described in FIG. 13. Consequently, for the e-mail a2 (A2), an e-mail to be resent is sent with the configuration illustrated in the example in FIG. 14 (Step S571). Step S571 is the same as Step S161 in FIG. 4. On the other hand, for the e-mail c1 (C1) and e-mail a2 (C2), e-mails to be resent are not sent. Here, the sender terminal 10a may execute the procedure described in FIG. 18 in response to receiving a resend-request e-mail. In this case, resend-rejection e-mails are sent for the e-mail c1 (C1) and e-mail a2 (C2).

The e-mails to be resent are transferred to the destination server 20b via the source server 20a and the relay server 20 (Steps S572 and S573). The destination server 20b executes the procedure described in FIG. 9 in response to receiving the e-mail to be resent. Consequently, the authentication state of the e-mail a2 (A2) is set to "authenticated".

The destination server 20b also executes the procedure described in FIG. 5 periodically (for example, hourly). Consequently, the e-mail c1 (C1) and e-mail c2 (A2) are removed from the received e-mail storage section 227 because an e-mail to be resent has not been received even though the predetermined time has passed since the resend-request date and time. Also, the received e-mail management information of the e-mail c1 (C1) and e-mail c2 (A2) are removed from the received e-mail management information storage section 226.

Here, if a resend-rejection e-mail is sent from the sender terminal 10a, the destination server 20b may not execute the procedure in FIG. 5, but may execute the procedure described in FIG. 20.

The received e-mails stored in the received e-mail storage section 227 of the destination server 20b are sent back in response to requests for obtaining the received e-mails (Steps S524, S551, and S574) from the recipient terminal 10b (Steps S505, S552, and S575). However, the destination server 20b sends back only received e-mails whose authentication states are set to "authenticated" when requests for obtaining e-mails are received. Therefore, at Step S505, the e-mail a1 (A1) is sent back. At Step S552, the received e-mail a3 (A3) is sent back. At Step S575, the received e-mail a2 (A2) is sent back.

Next, an example of process steps executed by the destination server 20b will be described in response to a request for obtaining the received e-mail (Steps S524, S551, and S574).

Figure 31:
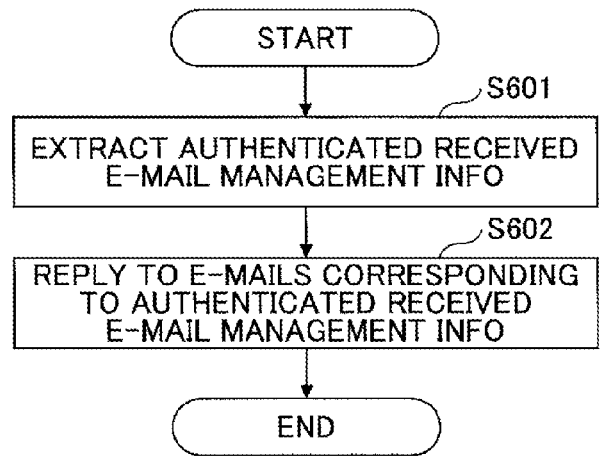
FIG. 31 is a flowchart for describing an example of process steps executed by a destination server in response to receiving a request for obtaining a received e-mail according to the fourth embodiment.

FIG. 31 is a flowchart for describing an example of process steps executed by the destination server 20b in response to receiving a request for obtaining a received e-mail according to the fourth embodiment.

In response to receiving a request for obtaining a received e-mail from the recipient terminal 10b, the received e-mail relay section 221 of the destination server 20b extracts received e-mail management information whose authentication state is set to "authenticated" from the received e-mail management information storage section 226 (see FIG. 11) (Step S601). Next, the received e-mail relay section 221 sends back the received e-mail identified by the pointer in the extracted received e-mail management information to the recipient terminal 10b (Step S602).

Here, the received e-mail relay section 221 may remove the received e-mail, which has been sent back, from the received e-mail storage section 227. Also, the received e-mail relay section 221 may remove the received e-mail management information of the received e-mail, which has been sent back, from the received e-mail management information storage section 226.

As described above, the function for determining validity of a received e-mail, which is implemented at the recipient terminals 10 according to the first or second embodiments, is implemented at the destination server 20b in a unified way according to the fourth embodiment. Therefore, if any one of multiple recipient terminals 10b does not have the electronic signature functions, the same effect can be obtained as in the first or second embodiments.

Here, the fourth embodiment may be combined with the third embodiment.

Next, the fifth embodiment will be described. According to the fifth embodiment, Web content (a Web page) is an object to be determined for validity.

Figure 32:
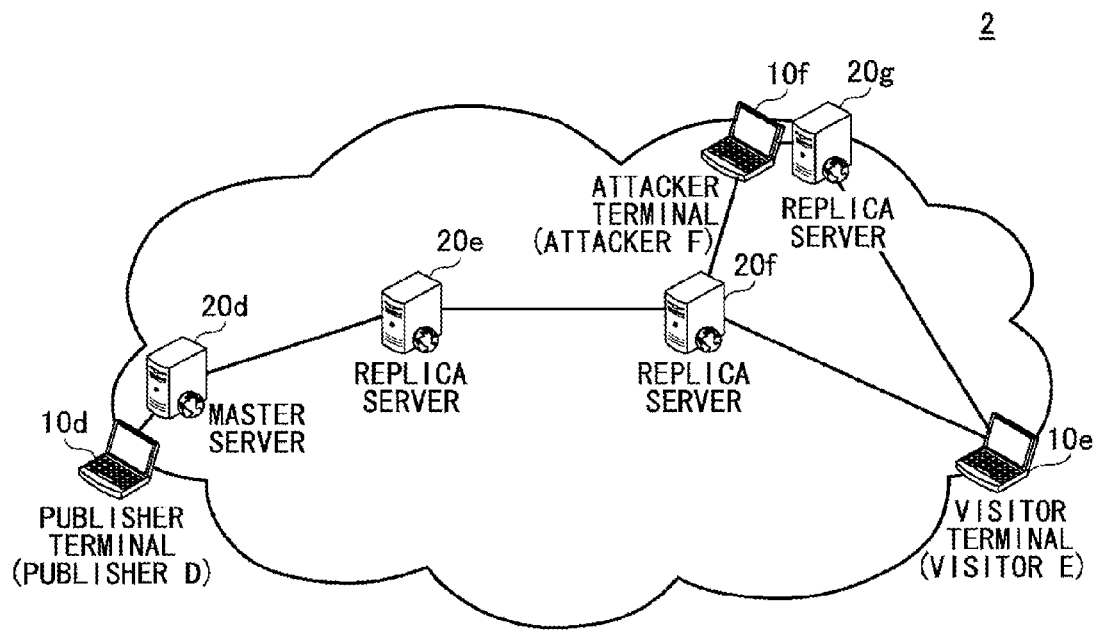
FIG. 32 is a schematic view illustrating an example of a configuration of a network of a Web system according to a fifth embodiment.

FIG. 32 is a schematic view illustrating an example of a configuration of a network of a Web system 2 according to the fifth embodiment. In FIG. 32, the Web system 2 includes a publisher terminal 10d, a visitor terminal 10e, an attacker terminal 10f, an master server 20d, a replica server 20e, a replica server 20f, a replica server 20g, and the like.

The publisher terminal 10d is a terminal used for generating, for example, Web content by a valid publisher D of the Web content. The publisher terminal 10d is connected with the master server 20d via a network such as a LAN, the Internet, or the like. The master server 20d is a computer for publishing the original content of Web content uploaded from the publisher terminal 10d. The master server 20d is connected with the replica server 20e, the replica server 20f, and the like via a network such as a LAN, the Internet, or the like. The replica server 20e and replica server 20f are computers for storing and publishing the original content of Web content. In the present embodiment, the replica server 20f is accessed by the visitor terminal 10e.

The visitor terminal 10e is a terminal used for browsing Web content by a visitor E. The visitor terminal 10e obtains (downloads) the Web content, for example, using HTTP (HyperText Transfer Protocol) from the replica server 20f.

The attacker terminal 10f is a terminal used by an attacker who pretends to be the publisher D. The replica server 20g is an invalid computer installed by the attacker F for obtaining personal information of the visitor E by redirecting the visitor terminal 10e to access the replica server 20g.

The hardware configuration of the terminals and the servers may be the same as exemplified in FIG. 2. However, the servers may not include the display unit 106 and the input unit 107.

Figure 33:
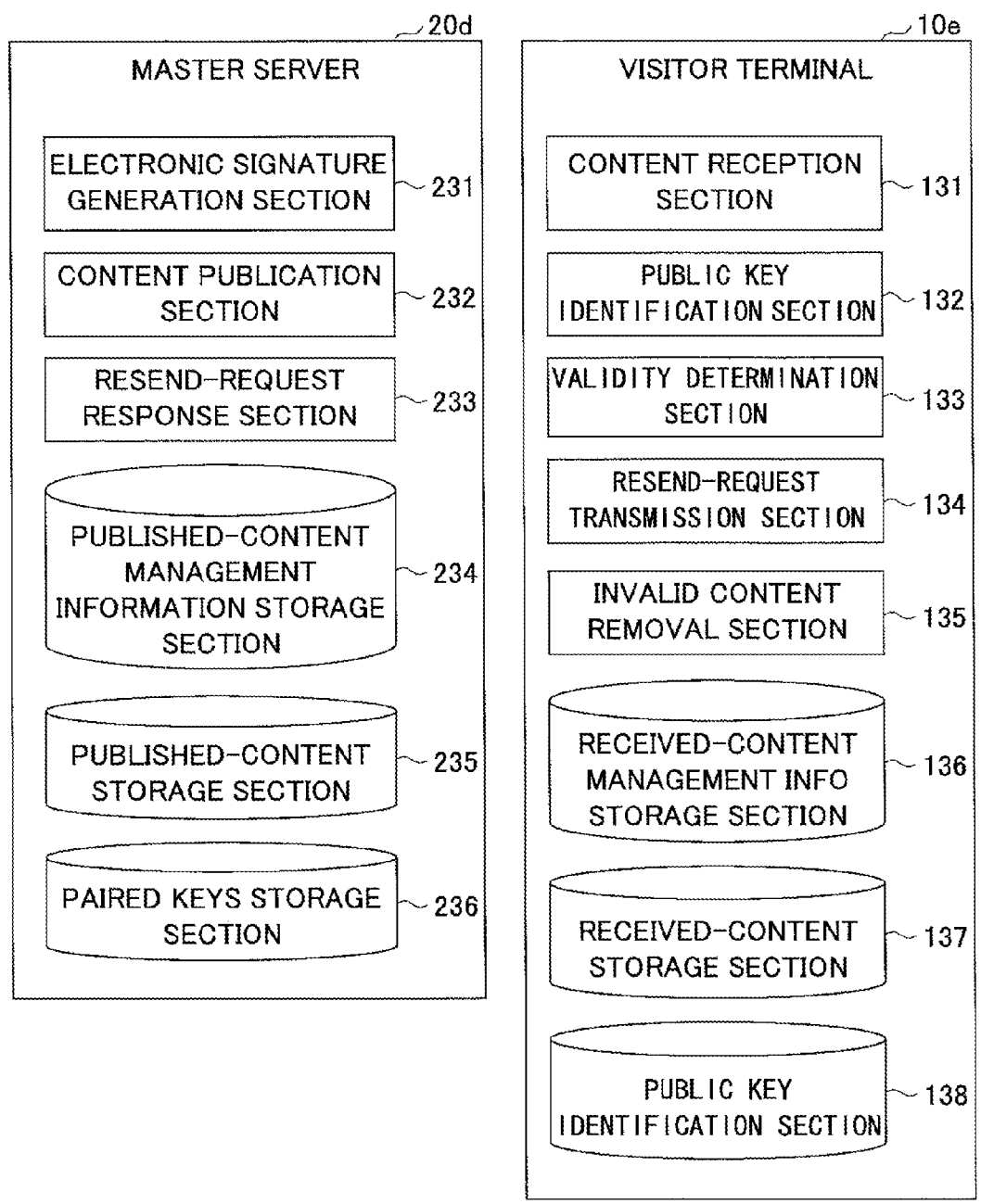
FIG. 33 is a schematic view illustrating an example of a functional configuration of a master server and a visitor terminal according to the fifth embodiment.

FIG. 33 is a schematic view illustrating an example of a functional configuration of the master server 20d and the visitor terminal 10e according to the fifth embodiment. In FIG. 33, the master server 20d includes an electronic signature generation section 231, a content publishing section 232, a resend-request response section 233, and the like. These sections are implemented by procedures that the program installed in the master server 20d has the CPU 104 of the master server 20d execute. The master server 20d also utilizes a published-content management information storage section 234, a published-content storage section 235, a paired-keys storage section 236, and the like. These storage sections may be implemented by the auxiliary storage unit 102 of the master server 20d, or a storage device connected with the master server 20d via a network.

The electronic signature generation section 231 generates an electronic signature of Web content to be published. The content publishing section 232 executes a procedure for publishing Web content. The Web content to be published has an electronic signature attached that is generated by the electronic signature generation section 231. The resend-request response section 233 executes a procedure in response to a resend-request of Web content. A resend-request of Web content is sent by the visitor terminal 10e to the master server 20d if validity of the received the content cannot be determined.

The published-content management information storage section 234 stores management information for each published Web content (called "published management information", hereafter). The published-content storage section 235 stores the entity part of the published Web content (for example, a file that stores the Web content). The paired-keys storage section 236 stores the associated pairs of private and public keys used for generating an electronic signature or for determining validity of Web content that has the electronic signature attached.

The visitor terminal 10e includes a content reception section 131, a public key identification section 132, a validity determination section 133, a resend-request transmission section 134, an invalid content removal section 135, and the like. These sections are implemented by procedures that the program installed in the visitor terminal 10e has the CPU 104 of the visitor terminal 10e execute. The visitor terminal 10e also utilizes a received-content management information storage section 136, a received-content storage section 137, a public key storage section 138, and the like. These storage sections may be implemented by the auxiliary storage unit 102 of the visitor terminal 10e, or a storage device connected with the visitor terminal 10e via a network.

The content reception section 131 receives Web content. The public key identification section 132 identifies a public key corresponding to the electronic signature attached to the Web content. The validity determination section 133 determines validity of received Web content based on whether the identified public key is valid. Whether the identified public key is valid is equivalent to determining whether the electronic signature attached to Web content is valid. The resend-request transmission section 134 sends a resend-request for Web content whose electronic signature is not valid, namely, validity is not confirmed. The validity determination section 133 also determines validity of Web content that has an invalid electronic signature attached based on whether resending is made in response to the resend-request. The invalid content removal section 135 removes Web content determined as invalid (or not determined as valid) by the validity determination section 133, and removes management information of the Web content from the received-content storage section 137 and the received-content management information storage section 136.

The received-content management information storage section 136 stores management information (called "received-content management information", hereafter) for all Web content that is received. The received-content storage section 137 stores the entity part of received Web content. The public key storage section 138 stores a public key that is paired with a private key used for generating an electronic signature.

Figure 34:
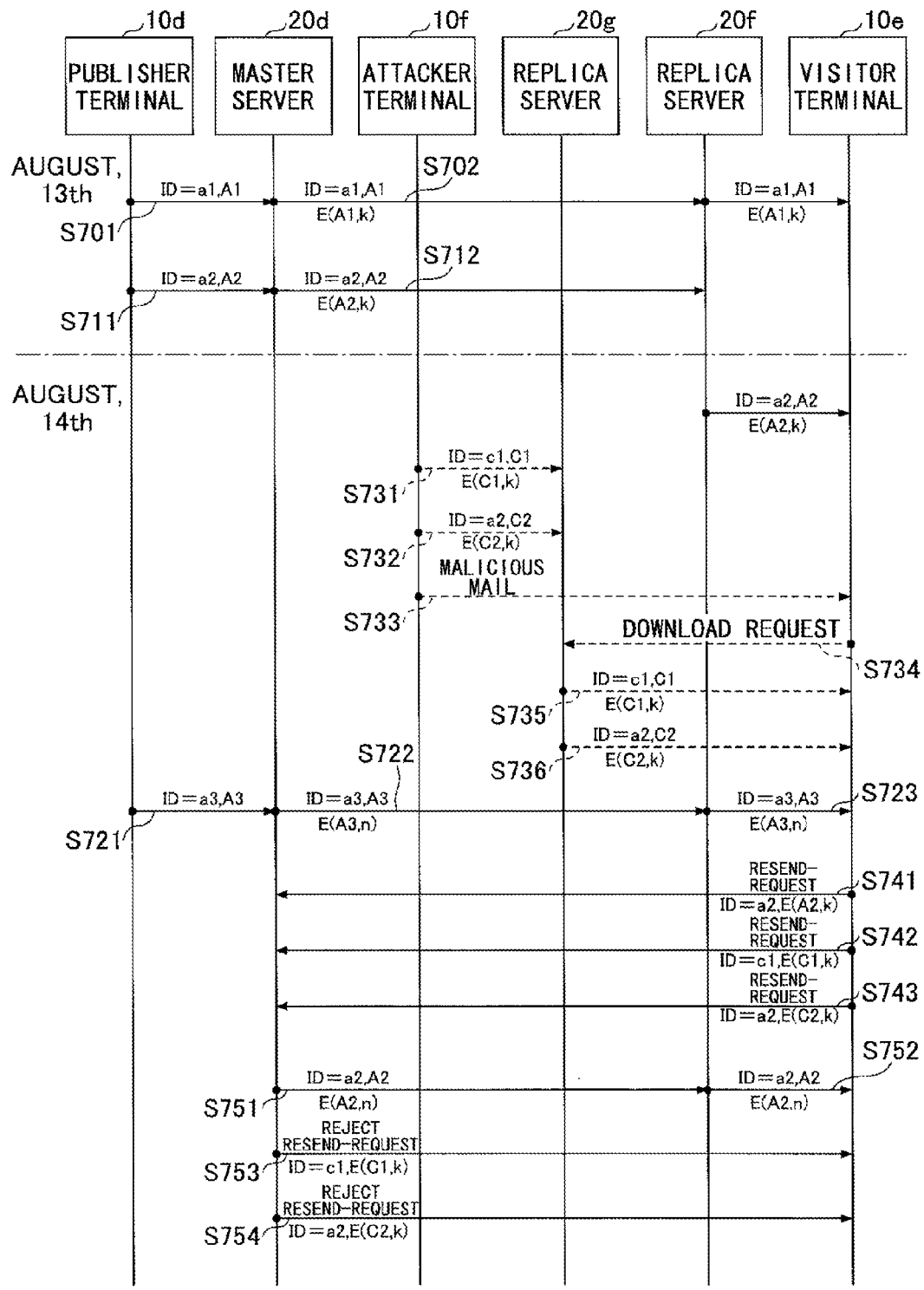
FIG. 34 is a sequence chart for describing an example of process steps executed on a Web system according to the fifth embodiment.

In the following, process steps executed on the Web system 2 will be described. FIG. 34 is a sequence chart for describing an example of process steps executed on the Web system 2 according to the fifth embodiment.

At Steps S701, S711, and S721, the publisher terminal 10d uploads Web content to the master server 20d. Here, Steps S701, S711, and S721 are assumed to be executed at timings different from each other to upload respective Web content different from each other.

Specifically, at Step 701, Web content is uploaded at a certain time on August, 13th, which has a content ID a1 and content A1 (called the "Web content a1 (A1)", hereafter, other Web contents are named following the same naming convention). The content ID is an example of identification information for identifying Web content in the present embodiment.

At Step S711, Web content a2 (A2) is uploaded at a certain time on August, 13th, which has a content ID a2 and a content A2.

At Step S721, Web content a3 (A3) is uploaded at a certain time on August, 14th, which has a content ID a3 and a content A3.

The master server 20d attaches an electronic signature to the uploaded Web content, and publishes it (Steps S702, S712, and S722). Publishing means that Web content is distributed, for example, to the replica server 20f and the like, and is put into a state where the visitor terminal 10e can access the Web content. In FIG. 34, the Web content a1 (A1) has an electronic signature E(A1,k) attached. The Web content a2

(A2) has an electronic signature E(A2,k) attached. The Web content a3 (A3) has an electronic signature E(A3,n) attached.

Here, the end date of the valid term of a private key k used for generating the electronic signatures attached to the Web content a1 (A1) and Web content a2 (A2) is assumed to be August, 13th. The start date of the valid term of a private key n used for generating the electronic signature E(A3,n) is assumed to be August, 14th.

The visitor terminal 10e downloads the Web content a1 (A1) from the replica server 20f in response to a direction by the visitor E on August, 13th (Step S703). The visitor terminal 10e also receives the Web content a2 (A2) and Web content a3 (A3) from the replica server 20f on August, 14th (Steps S713 and S723). Here, the Web contents may be downloaded from the master server 20d.

On the other hand, the attacker terminal 10f uploads invalid Web contents c1 (C1) and a2 (C2) to the replica server 20g on August, 14th (Steps S731 and S741). The Web content c1(C1) has the electronic signature E(C1,k) attached, and the Web content a2 (C2) has the electronic signature (C2,k) attached. Namely, at the attacker terminal 10f, the electronic signatures are generated using the private key k which is supposed to be held by only the publisher D. Also, the Web content a2 (C2) has the common content ID with the Web content a2 (A2).

Further, the attacker terminal 10f sends a malicious e-mail to the visitor E for redirecting the visitor E to access the Web content c1 (C1) and Web content a2 (C2) (Step S733). In the malicious e-mail, URLs (Uniform Resource Locators) of the Web content c1 (C1) and Web content a2 (C2) are described, for example.

If the malicious e-mail is viewed at the visitor terminal 10e and the URLs are clicked, the visitor terminal 10e sends requests for downloading the Web content c1 (C1) and Web content a2 (C2) to the replica server 20g (Step S734). In response to the requests for downloading, the replica server 20g sends back the Web content c1(C1) and Web content a2 (C2) (Steps S735 and S736).

Among the Web contents downloaded by the visitor terminal 10e, Web contents whose electronic signatures are expired are the Web content a2 (A2), Web content c1 (C1), and Web content a2 (C2). Thereupon, the visitor terminal 10e sends resend-requests for these three Web contents to the master server 20d, respectively (Steps S741, S742, and S743).

In response to the resend-requests, the master server 20d resends the Web content a2 (A2) because the master server 20d has published it in the past (Steps S751 and S752). On the other hand, for the Web content c1(C1) and Web content a2 (C2) that are not published by the master server 20d, the master server 20d sends back resend-rejection messages (Steps S753 and S754). Here, the resend-rejection message may not be sent.

Next, process steps executed by the master server 20d will be described when publishing Web content uploaded at Steps S701, S711, and S721, respectively, in FIG. 34.

Figures 35, 36:
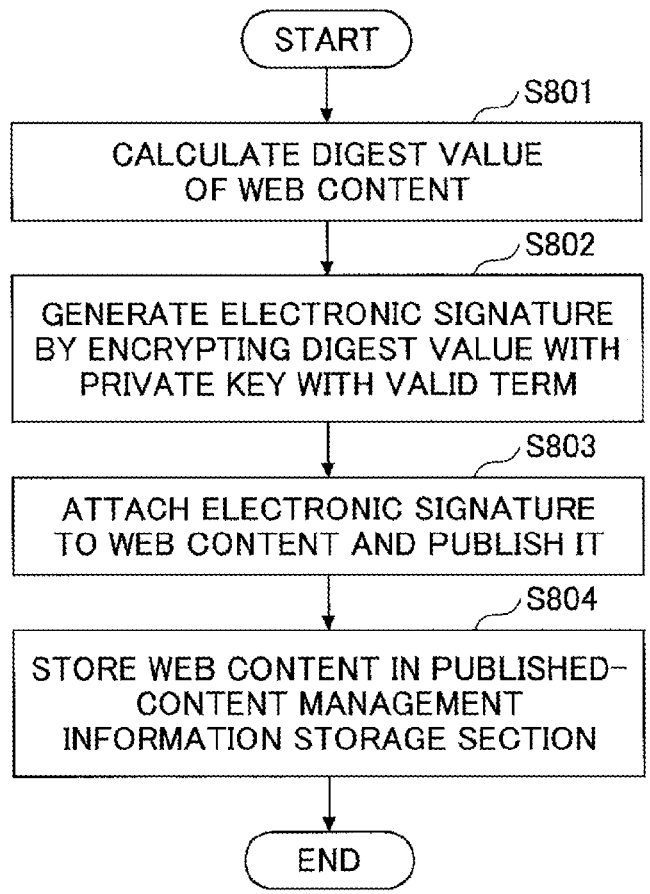
FIG. 35 is a flowchart for describing an example of process steps executed by a master server when publishing Web content according to the fifth embodiment.
FIG. 36 is a schematic view illustrating an example of a configuration of Web content according to the fifth embodiment.

FIG. 35 is a flowchart for describing an example of process steps executed by the master server 20d when publishing Web content according to the fifth embodiment.

At Step S801, the publisher terminal 10d of the electronic signature generation section 231 calculates a digest value of Web content to be published using a predetermined hash function. Next, the electronic signature generation section 231 generates an electronic signature of the calculated digest value by encrypting with a private key whose valid term includes the current date and time (Step S802). The private key within the valid term is obtained from the paired-keys storage section 236. Here, the configuration and stored contents of the paired-keys storage section 236 are assumed to be the same as the example illustrated in FIG. 6 for convenience's sake. Therefore, at Step S802, if the current date is August, 13th, the private key k is used. On the other hand, if the current date is August, 14th, the private key n is used.

Next, the content publishing section 232 attaches the electronic signature to the Web content, and publishes the Web content (Step S803). For example, the Web content is distributed to the replica server 20e, the replica server 20f, and the like.

FIG. 36 is a schematic view illustrating an example of a configuration of Web content according to the fifth embodiment. In FIG. 36, the Web content includes creation date and time, a site ID, a content ID, a body, an electronic signature, and the like. Among these, a part excluding the electronic signature is called an "entity part" in the following.

The creation date and time are the creation date and time of the Web content. The site ID is identification information of the master server 20d that publishes the Web content. The content ID is an ID of the Web content. The body is, for example, HTML (HyperText Markup Language) data. The electronic signature is an encrypted value of the digest value of the entity part with a private key (in FIG. 36, the private key k is used).

Next, the content publishing section 232 stores publishedcontent management information about the published Web content in the published-content management information storage section 234 (Step S804).

Figure 37:
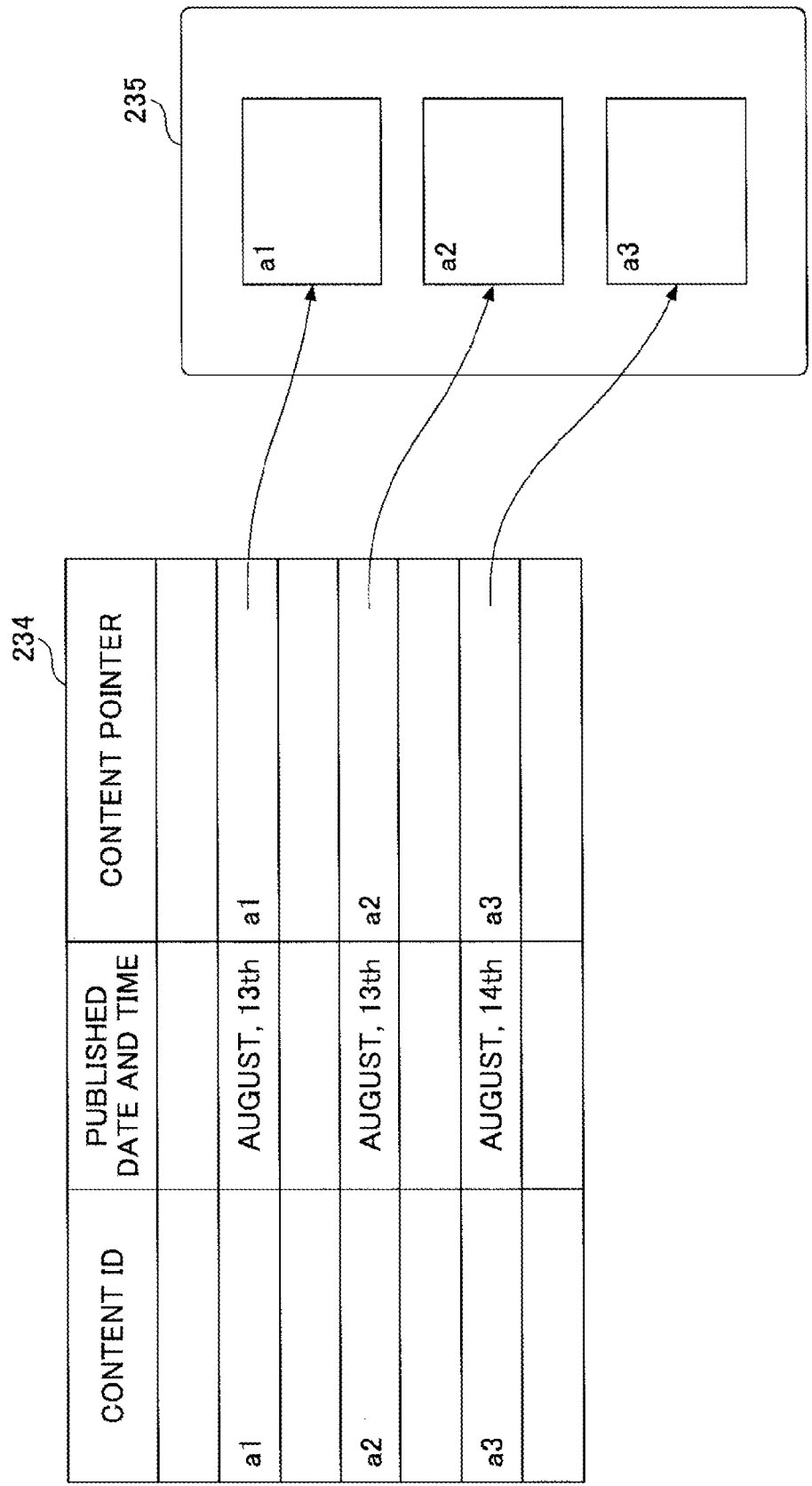
FIG. 37 is a schematic view illustrating an example of a configuration of a published-content management information storage section.

FIG. 37 is a schematic view illustrating an example of a configuration of the published-content management information storage section 234. In FIG. 37, the published-content management information storage section 234 stores the content ID, the published date and time, the content pointer, and the like for each published Web content. The content ID is the ID of the Web content. The published date and time are the published date and time of the Web content. The content pointer is address information of a storage area where the Web content is stored in the published-content storage section 235. Here, FIG. 37 illustrates a state when Step S721 in FIG. 34 is completed.

Next, process steps executed by the visitor terminal 10e will be described in response to receiving Web content sent back for a download request in FIG. 34.

Figure 38:
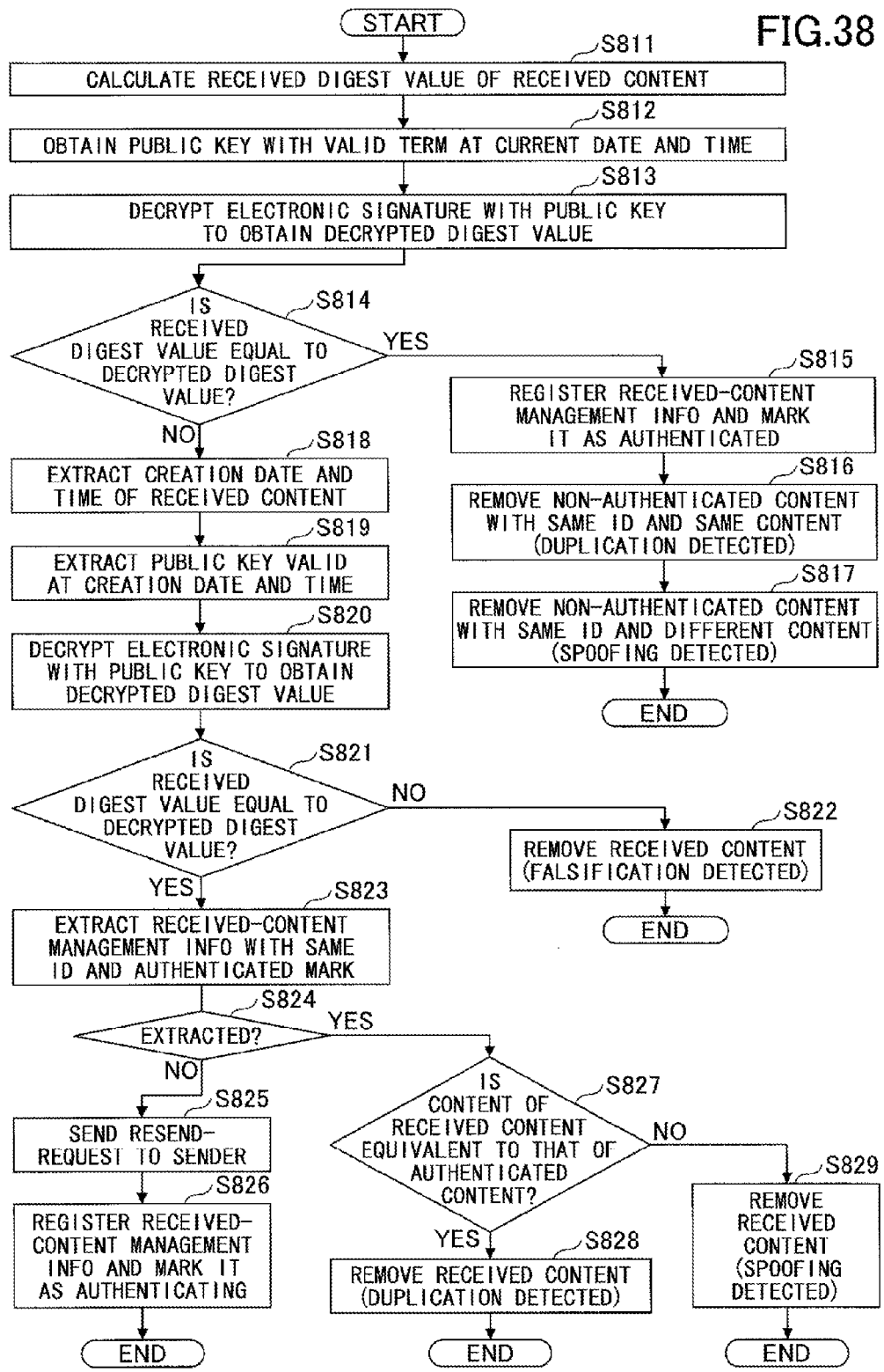
FIG. 38 is a flowchart for describing an example of process steps executed by a visitor terminal in response to receiving Web content according to the fifth embodiment.

FIG. 38 is a flowchart for describing an example of process steps executed by the visitor terminal 10e in response to receiving Web content according to the fifth embodiment. The content of each processing step in FIG. 38 is substantially the same as the step in FIG. 9 that has the same step number in the last two digits. Therefore, in FIG. 38, points that differ from those in FIG. 9 will be described.

First, in FIG. 38, received Web content (called a "received content", hereafter) is processed instead of a received e-mail.

Also, the steps executed by the public key identification section 122 in FIG. 9 are executed by the public key identification section 132. The steps executed by the validity determination section 123 are executed by the validity determination section 133. The steps executed by the resend-request transmission section 124 are executed by the resend-request transmission section 134. The steps executed by the invalid e-mail removal section 125 are executed by the invalid content removal section 135.

Figure 39:
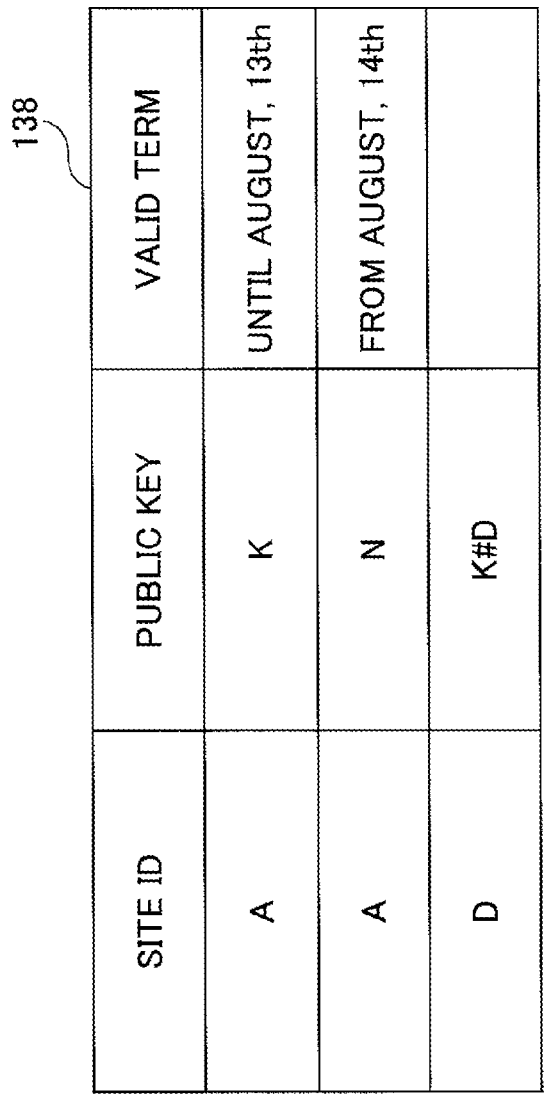
FIG. 39 is a schematic view illustrating an example of a configuration of a public key storage section according to the first embodiment.

Also, instead of the public key storage section 128 (FIG. 10), the public key storage section 138 is used. FIG. 39 is a schematic view illustrating an example of a configuration of the public key storage section 138 according to the first embodiment.

For each public key corresponding to a private key used for generating an electronic signature, the public key storage section 138 stores the site ID, the public key, the valid term, and the like. The site ID is identification information of the master server 20*d* that has the private key corresponding to the public key. The public key is the entity part of the public key. The valid term is the valid term of the public key. The valid term is equivalent to the valid term of the corresponding private key.

For example, at Step S812, a public key that has the valid term including the current date and time is obtained by the public key storage section 138 among public keys corresponding to the site ID that is included in the received Web content.

Figures 40, 41:
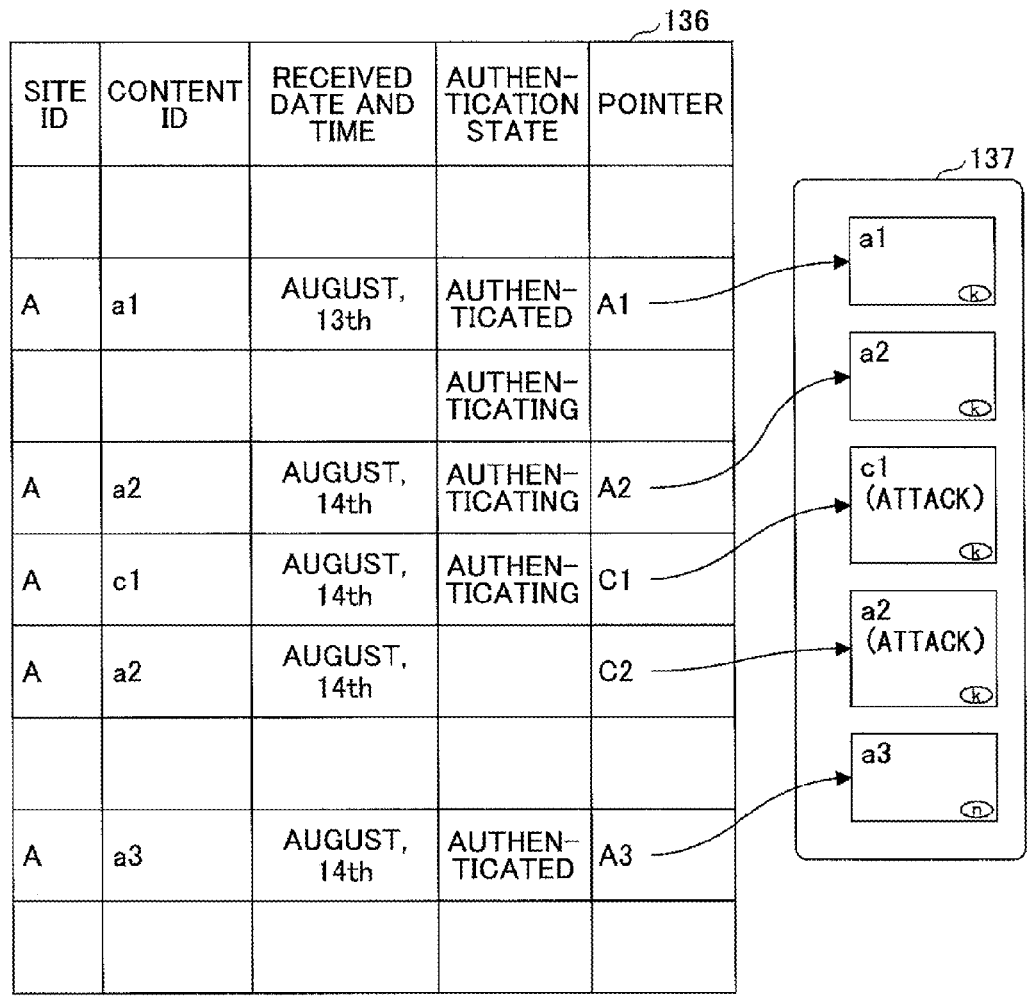
FIG. 40 is a schematic view illustrating an example of a configuration of a received-content management information storage section according to the fifth embodiment.
FIG. 41 is a schematic view illustrating an example of a configuration of a resend-request message according to the fifth embodiment.

Also, instead of the received e-mail management information storage section 126, the received-content management information storage section 136 is used. FIG. 40 is a schematic view illustrating an example of a configuration of the received-content management information storage section 136 according to the fifth embodiment. In FIG. 40, the received-content management information storage section 136 stores the site ID, the content ID, the received date and time, the authentication state, the pointer, and the like for individual Web content that is received.

The site ID is the site ID of the publisher of the received content. The content ID is the ID of the received content. The received date and time are the date and time when the received content is received. The authentication state is an authentication state of validity of the publisher of the received content or the received content itself. The pointer is a link to an address of a storage area where the received content is stored in the received-content storage section 137. Here, FIG. 40 illustrates a state when Step S743 in FIG. 34 is completed.

Also, instead of the received e-mail storage section 127, the received-content storage section 137 is used.

Also, at Step S826, a resend-request message illustrated in FIG. 41 is sent using, for example, HTTP.

FIG. 41 is a schematic view illustrating an example of a configuration of a resend-request message according to the fifth embodiment. In FIG. 41, the body of the resend-request message includes a keyword "RESEND-REQUEST" designating that it is a resend-request, the content ID, the electronic signature, and the like. The content ID is the content ID of the received content relevant to the resend-request. The electronic signature is an electronic signature attached to the received content relevant to the resend-request.

Figure 42:
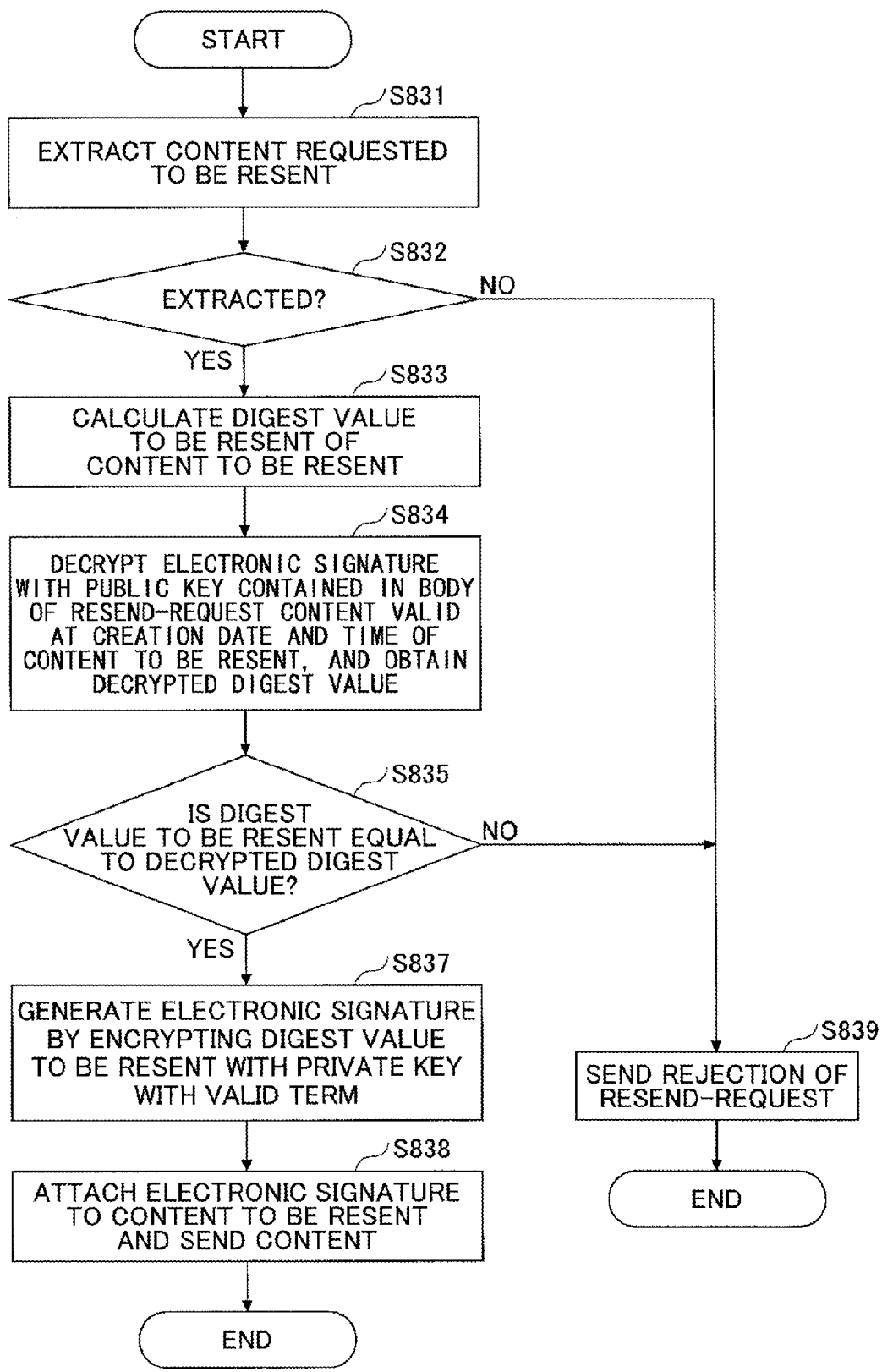
FIG. 42 is a flowchart for describing an example of process steps executed by an master server in response to receiving a resend-request message according to the fifth embodiment.

Next, process steps executed by the master server 20*d* will be described in response to receiving a resend-request message. FIG. 42 is a flowchart for describing an example of process steps executed by the master server 20*d* in response to receiving a resend-request message according to the fifth embodiment. The content of each processing step in FIG. 42 is substantially the same as the step in FIG. 18 that has the same step number in the last two digits. Therefore, in FIG. 42, points that differ from those in FIG. 18 will be described.

First, in FIG. 42, Web content is processed instead of an e-mail. Also, the steps executed by the resend-request response section 113 are executed by the resend-request response section 233. Also, the steps executed by the electronic signature generation section 111 are executed by the electronic signature generation section 231. Also, instead of the sent e-mail management information storage section 114, the published-content management information storage section 234 is used. Also, instead of the paired-keys storage section 116, the paired-keys storage section 236 is used. Also, there is no step that corresponds to Step S236. This is because recipients of Web content are not identified, which differs from an e-mail. Also, at Step S838, for example, Web content illustrated in FIG. 43 is resent. Here, Web content to be resent is called "Web content to be resent".

FIG. 43 is a schematic view illustrating an example of a configuration of content to be resent according to this embodiment. FIG. 43 illustrates an example of a configuration of content to be resent when the Web content illustrated in FIG. 36 (called the "original content", hereafter) is to be resent. The entity part of the content to be resent is the same as the entity part of the original content. For example, the creation date and time of the content to be resent are the same as the creation date and time of the original content. On the other hand, the electronic signature of the content to be resent differs from the electronic signature of the original content. This is because the electronic signature of the content to be resent is generated using a private key valid at the timing of resending.

Further, at Step S839, a resend-rejection message is sent using, for example, HTTP that includes substantially the same information as the resend-rejection e-mail illustrated in the example in FIG. 19. The resend-rejection message has a configuration in that, for example, the source address in the resend-rejection e-mail in FIG. 19 is replaced with the site ID, and the destination address in FIG. 19 is removed.

As described above, according to the fifth embodiment, validity of Web content can be determined that has an electronic signature attached whose valid term is expired.

It is noted that the above embodiments may be applied for distributing electronic data, for example, such as document data, image data, moving picture data, audio data, a program, or the like.

It is also noted that in the above embodiments, the sender terminal 10*a*, the source server 20*a*, or the master server 20*d* is an example of a sending apparatus. The recipient terminal 10*b*, the destination server 20*b*, or the visitor terminal 10*e* is an example of a receiving apparatus. The public key identification section 122, the public key identification section 222, or the public key identification section 132 is an example of an identification section. The resend-request transmission section 124, the resend-request transmission section 224, or the resend-request transmission section 134 is an example of a transmission section. The validity determination section 123, the validity determination section 223, or the validity determination section 133 is an example of a determination section.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A validity determination method comprising:
    having a first Central Processing Unit (CPU) of a receiving apparatus of electronic data
    identify a first public key corresponding to an electronic signature attached to the received electronic data based on current date and time, among multiple public keys having respective valid terms,
    identify a second public key corresponding to the electronic signature based on a creation date and time, among the multiple public keys having respective valid terms, when the first public key corresponding to the electronic signature is not identified based on the current date and time, determine that the electronic signature of the electronic data has expired when a digest value, which is acquired by decrypting the electronic signature by using the second public key being identified, is valid, and send a resend-request for the electronic data, and determine that the electronic data are valid, when the electronic data are received with respect to the resend-request;

having a second Central Processing Unit (CPU) of a sending apparatus of the electronic data resend the electronic data to the receiving apparatus in response to receiving the resend-request if the sending apparatus has sent the electronic data relevant to the resend-request in a past; and further having the first CPU of the receiving apparatus of the electronic data determine the electronic data, in which the electronic signature is expired, as a spoofing electronic data, when content of the electronic data is different from content of authenticated electronic data.

2. The validity determination method as claimed in claim 1, wherein when sending the resend-request, the first CPU of the receiving apparatus includes the electronic signature attached to the electronic data in the resend-request, wherein when resending the electronic data, the second CPU of the sending apparatus resends the electronic data to the receiving apparatus if the electronic data has been sent in the past and corresponds to the electronic signature included in the resend-request.

3. The validity determination method as claimed in claim 1, wherein when sending the resend-request, the first CPU of the receiving apparatus includes identification information of the electronic data included in the resend-request, wherein, in response to receiving the resend-request, the second CPU of the sending apparatus responds with a rejection of the resending by specifying the identification information included in the resend-request if the electronic data relevant to the resend-request has not been sent in the past.

4. A non-transitory computer-readable recording medium having a program stored therein for causing a computer to execute a validity determination method, the method comprising:

having a first Central Processing Unit (CPU) of a receiving apparatus of electronic data identify a first public key corresponding to an electronic signature attached to received electronic data based on current date and time, among multiple public keys having respective valid terms;

identify a second public key corresponding to the electronic signature based on a creation date and time, among the multiple public keys having respective valid terms, when the first public key corresponding to the electronic signature is not identified based on the current date and time;

determine that the electronic signature of the electronic data has expired when a digest value, which is acquired by decrypting the electronic signature by using the second public key being identified, is valid, and sending a resend-request of the electronic data;

determine that the electronic data are valid, when the electronic data are received with respect to the resend-request;

having a second Central Processing Unit (CPU) of a sending apparatus of the electronic data resend the electronic data to the receiving apparatus in response to receiving the resend-request if the sending apparatus has sent the electronic data relevant to the resend-request in a past; and further having the first CPU of the receiving apparatus of the electronic data determine the electronic data, in which the electronic signature is expired, as a spoofing electronic data, when content of the electronic data is different from content of authenticated electronic data.

5. A validity determination apparatus comprising:

a first Central Processing Unit (CPU) of the validity determination apparatus to perform a process including identifying a first public key corresponding to an electronic signature attached to received electronic data based on current date and time, among multiple public keys having respective valid terms;

identifying a second public key corresponding to the electronic signature based on a creation date and time, among the multiple public keys having respective valid terms, when the first public key corresponding to the electronic signature is not identified based on the current date and time;

determining that the electronic signature of the electronic data has expired when a digest value, which is acquired by decrypting the electronic signature by using the second public key being identified, is valid, and sending a resend-request of the electronic data;

determining that the electronic data are valid, when the electronic data are received with respect to the resend-request;

having a second Central Processing Unit (CPU) of a sending apparatus of the electronic data resend the electronic data to the validity determination apparatus in response to receiving the resend-request if the sending apparatus has sent the electronic data relevant to the resend-request in a past; and having the first CPU determine the electronic data, in which the electronic signature is expired, as a spoofing electronic data, when content of the electronic data is different from content of authenticated electronic data.

6. The validity determination method as claimed in claim 1, further having the first CPU of the receiving apparatus of the electronic data determine that the electronic data is invalid, when the electronic data are not received with respect to the resend-request.

7. The non-transitory computer-readable recording medium as claimed in claim 4, further comprising determining that the electronic data is invalid, when the electronic data are not received with respect to the resend-request.

8. The validity determination apparatus as claimed in claim 5, wherein the process further includes determining that the electronic data is invalid, when the electronic data are not received with respect to the resend-request.

* * * * *